(12) United States Patent
Jung et al.

(10) Patent No.: US 12,163,617 B2
(45) Date of Patent: Dec. 10, 2024

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Bongjin Kim, Seoul (KR); Minsu Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 18/034,677

(22) PCT Filed: Nov. 1, 2021

(86) PCT No.: PCT/KR2021/015521
§ 371 (c)(1),
(2) Date: Apr. 29, 2023

(87) PCT Pub. No.: WO2022/092944
PCT Pub. Date: May 5, 2022

(65) Prior Publication Data
US 2023/0408021 A1 Dec. 21, 2023

(30) Foreign Application Priority Data
Nov. 2, 2020 (KR) .................. 10-2020-0144779

(51) Int. Cl.
*F25D 23/00* (2006.01)
*F16L 59/065* (2006.01)
*F25D 23/06* (2006.01)

(52) U.S. Cl.
CPC .......... *F16L 59/065* (2013.01); *F25D 23/062* (2013.01); *F25D 23/065* (2013.01); *F25D 2201/14* (2013.01)

(58) Field of Classification Search
None
See application file for complete search history.

(56) References Cited

U.S. PATENT DOCUMENTS

| 2010/0251653 A1 | 10/2010 | Mills |
| 2020/0248955 A1 | 8/2020 | Kim et al. |

(Continued)

FOREIGN PATENT DOCUMENTS

| KR | 10-2013-0048527 A | 5/2013 |
| KR | 10-2019-0013333 A | 2/2019 |

(Continued)

OTHER PUBLICATIONS

International Search Report (with English Translation) and Written Opinion dated Feb. 15, 2022 issued in Application No. PCT/KR2021/015521.

*Primary Examiner* — Alexander S Thomas
(74) *Attorney, Agent, or Firm* — KED & Associates LLP

(57) ABSTRACT

A vacuum adiabatic body of the present embodiment may include a first plate, a second plate, a seal configured to seal the first plate and the second plate to provide a vacuum space, and a support configured to maintain the vacuum space. Optionally, the support may include a first support having a first support plate formed in a grid shape, and a plurality of spacer coupling portions configured to protrude from the first support plate. Optionally, the support may a second support having a second support plate formed in a grid shape, and a plurality of spacers configured to protrude from the second support plate and coupled to each of the plurality of spacer coupling portions to form a plurality of bars together with the plurality of spacer coupling portions. Optionally, the support may a radiation resistance sheet supported by a portion of the plurality of bars and spaced apart from at least one of the first support plate and the second support plate. Optionally, the plurality of spacer (Continued)

coupling portions may be arranged in a plurality of columns and a plurality of rows in the first support plate. Optionally, only a spacer coupling portion having the same shape may be provided in some columns of a plurality of columns, and spacer coupling portions having a different shape may be provided in some other columns.

20 Claims, 19 Drawing Sheets

(56) References Cited

U.S. PATENT DOCUMENTS

2021/0123660 A1  4/2021  Han et al.
2021/0140704 A1  5/2021  Kim et al.

FOREIGN PATENT DOCUMENTS

| KR | 10-2019-0013345 A | 2/2019 |
| KR | 10-2019-0018835 A | 2/2019 |
| WO | WO 2017-023094 A1 | 2/2017 |

[Fig. 1]
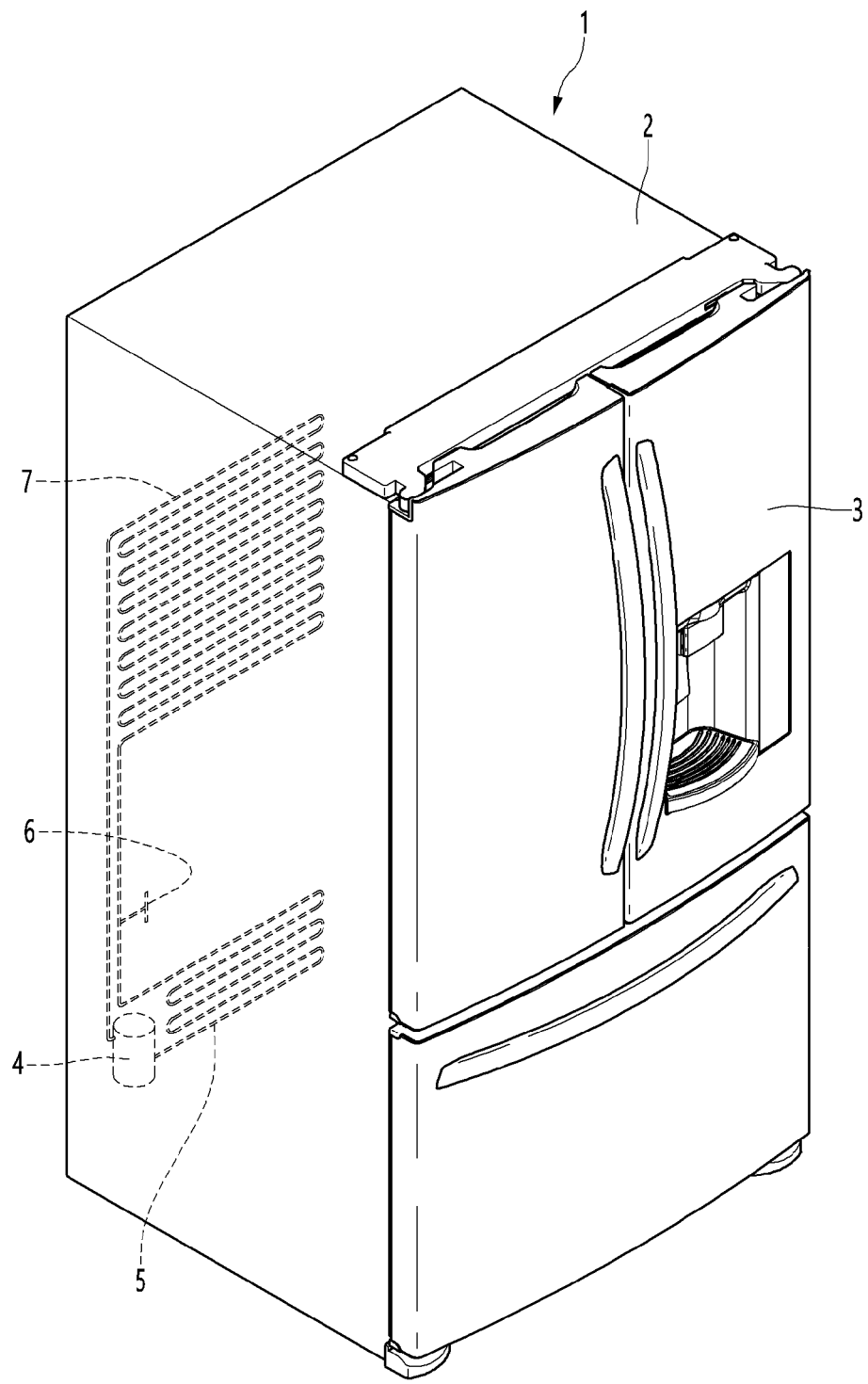

[Fig. 2]
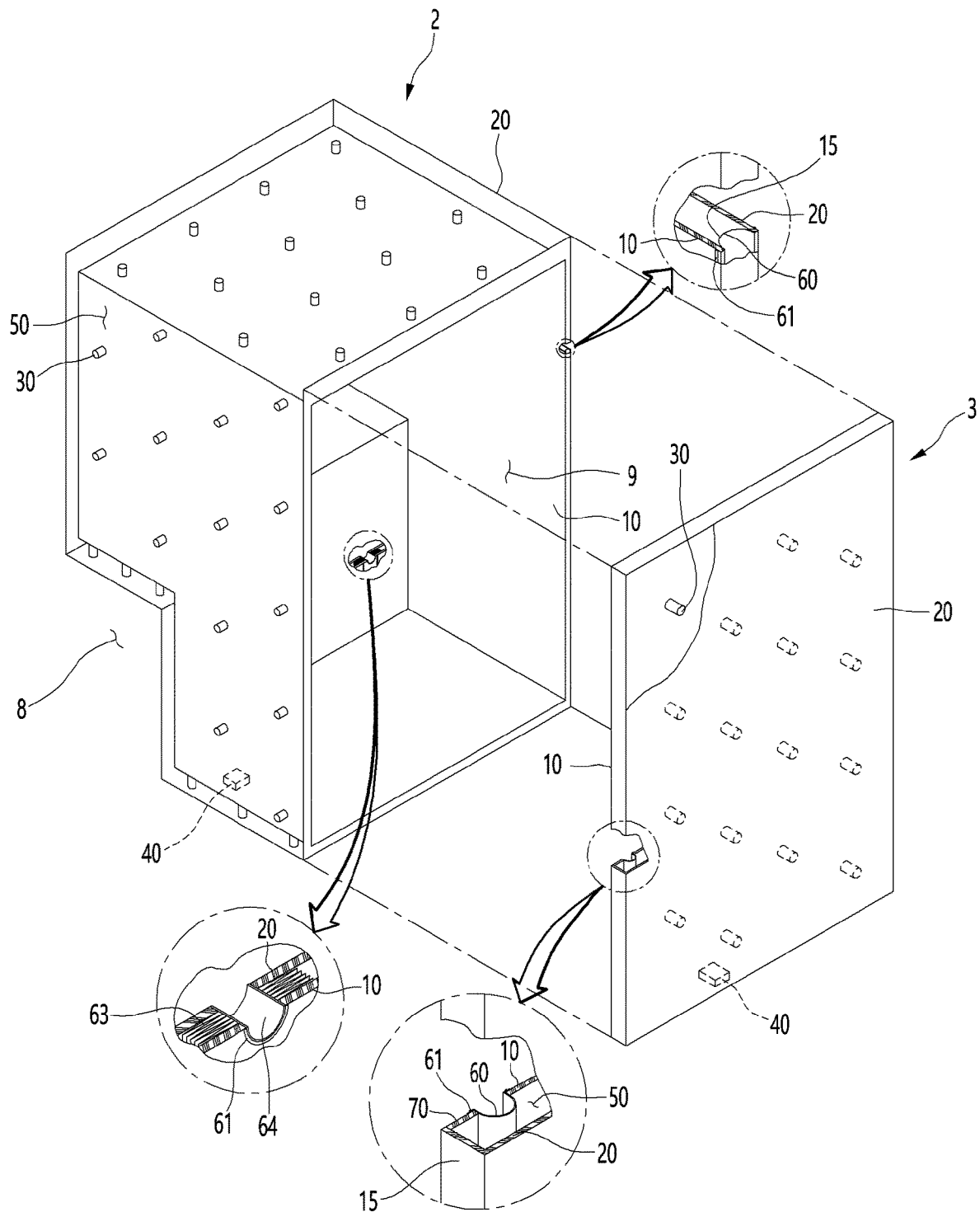

[Fig. 3]
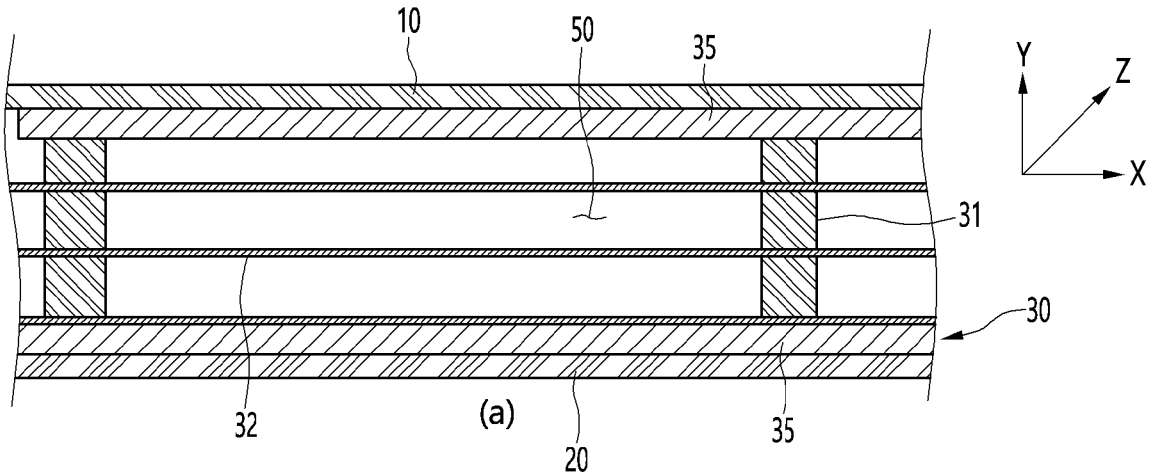
(a)
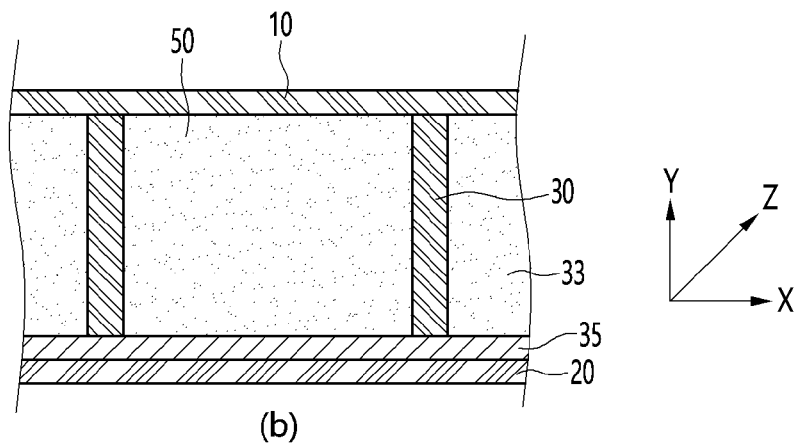
(b)
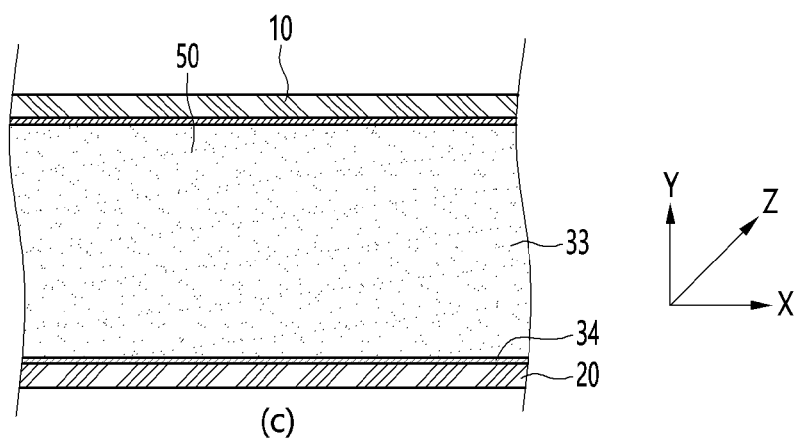
(c)

[Fig. 4]
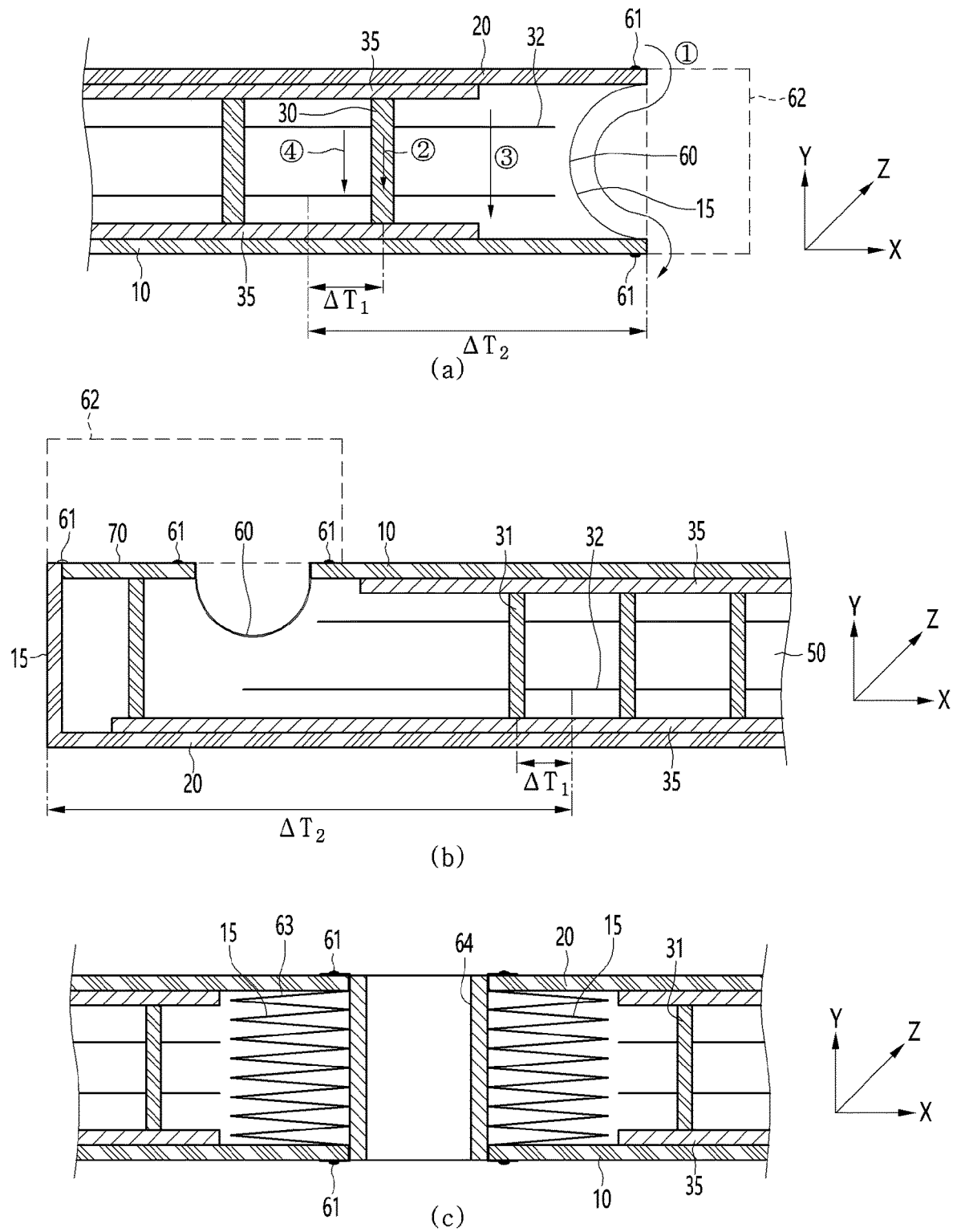

[Fig. 5]
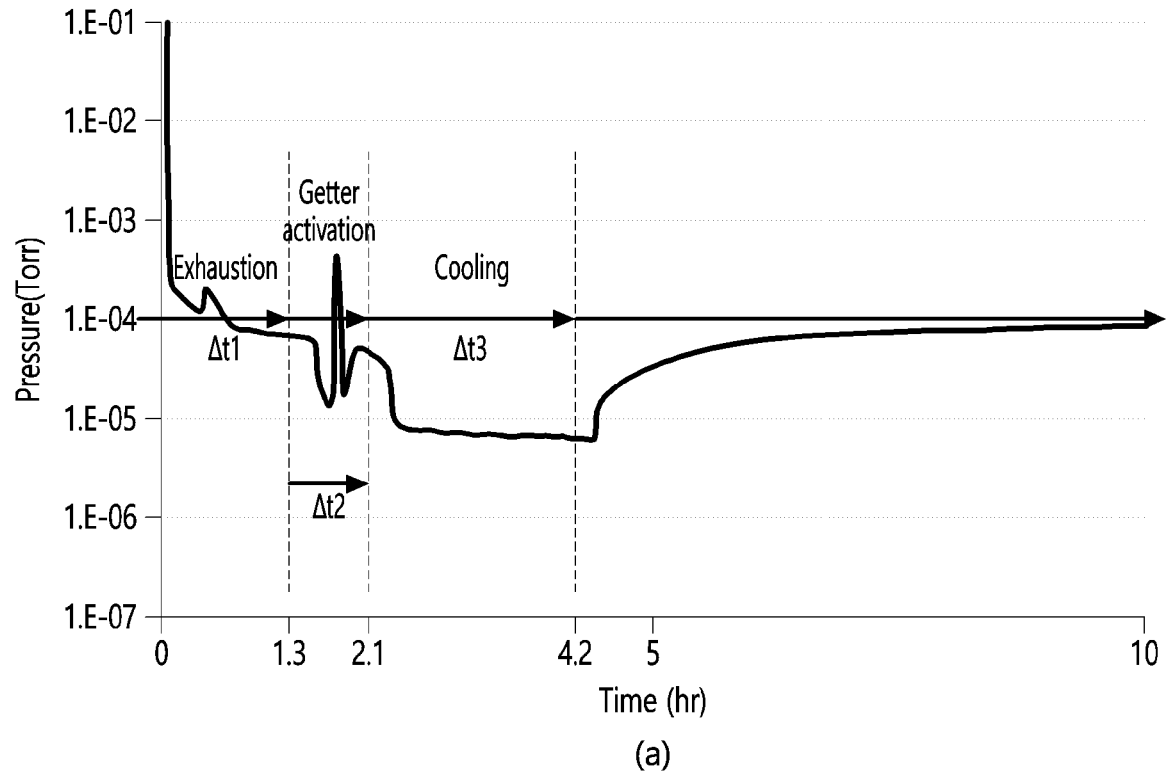
(a)
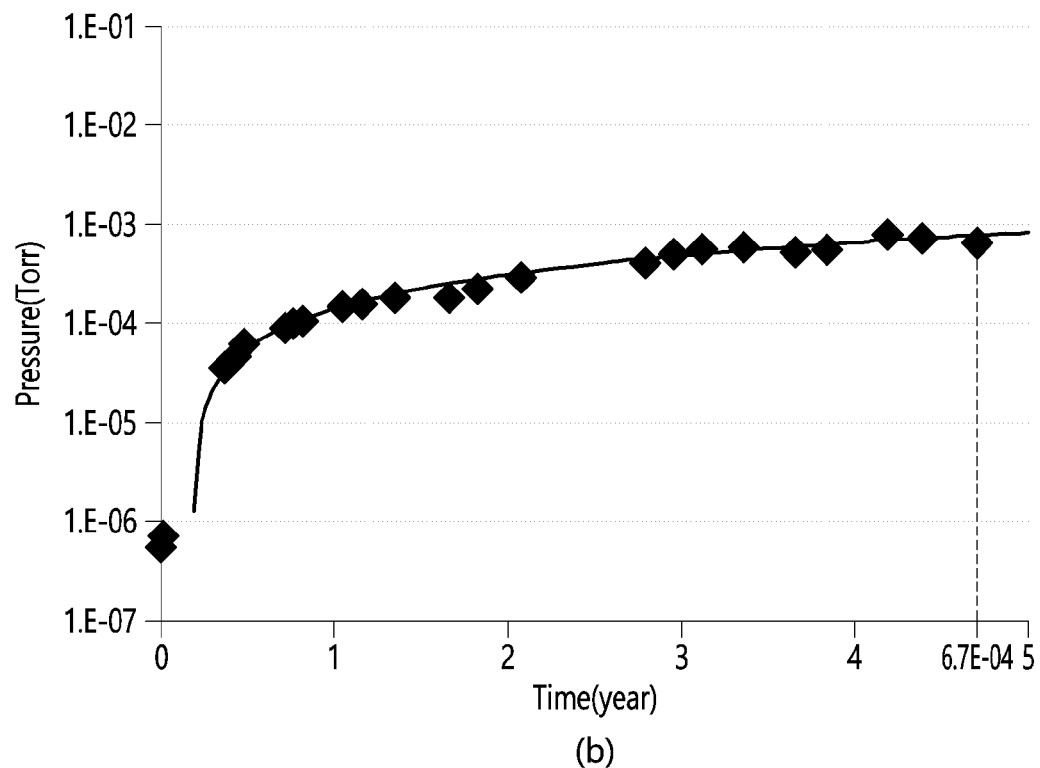
(b)

[Fig. 6]
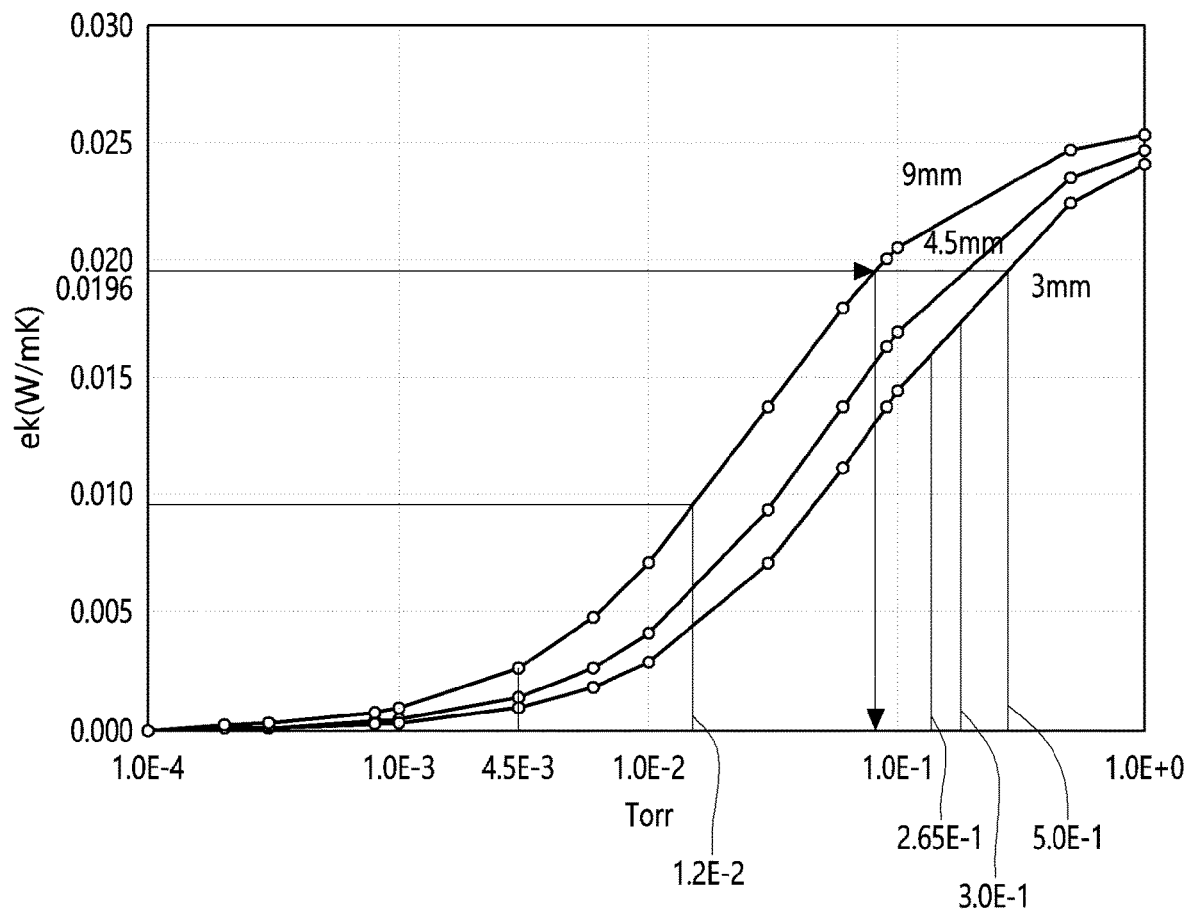

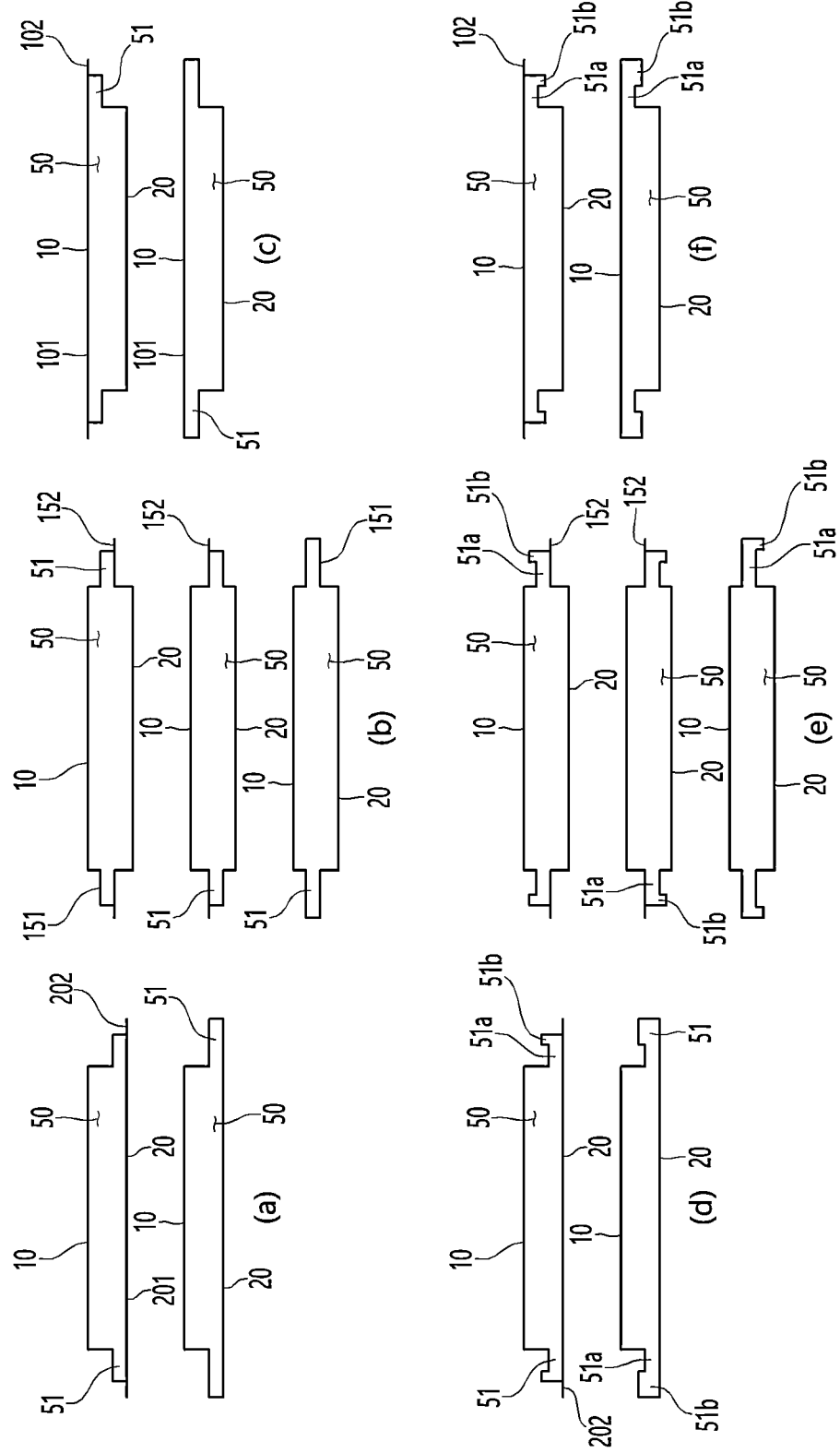
[Figure 7]

[Figure 8]
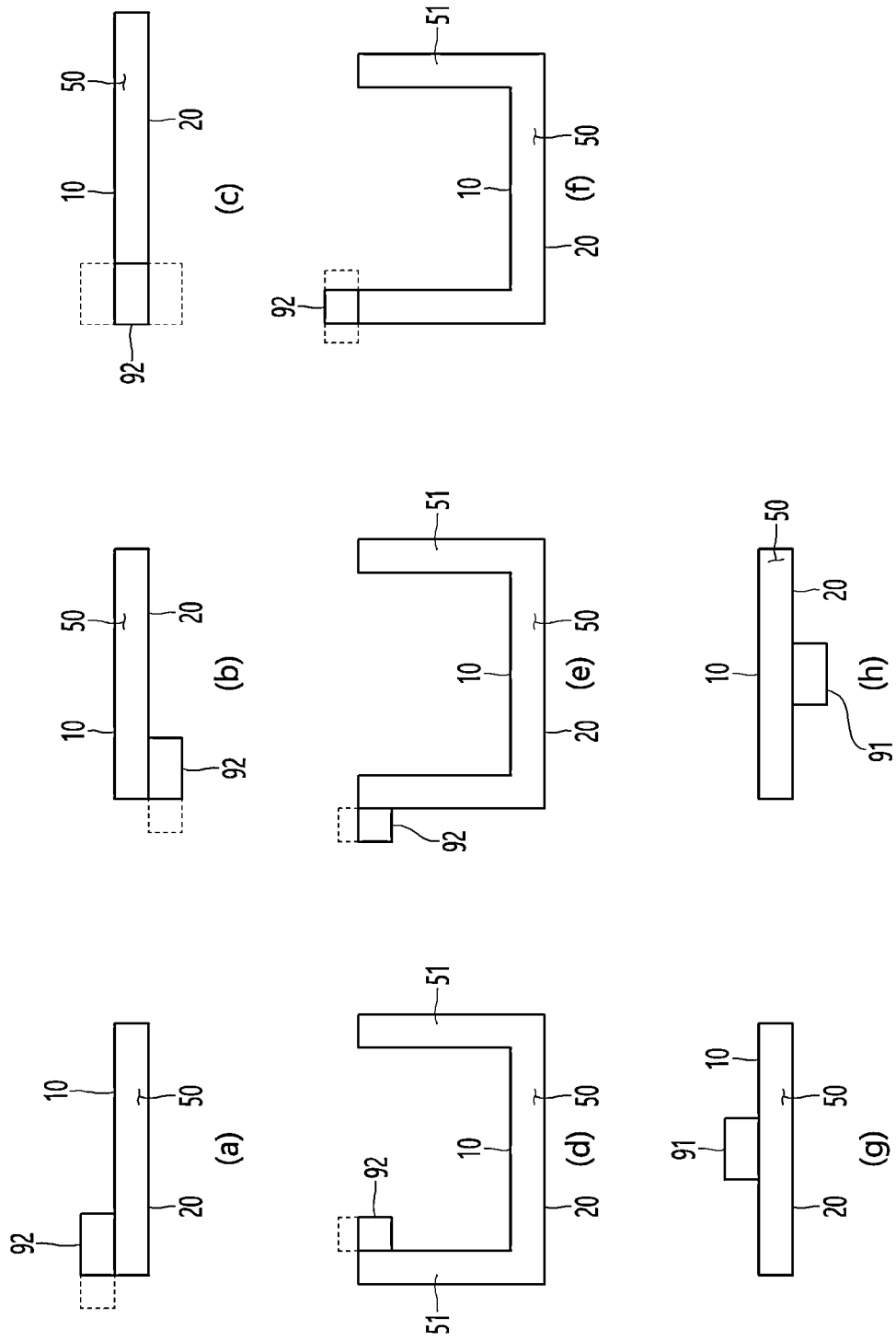

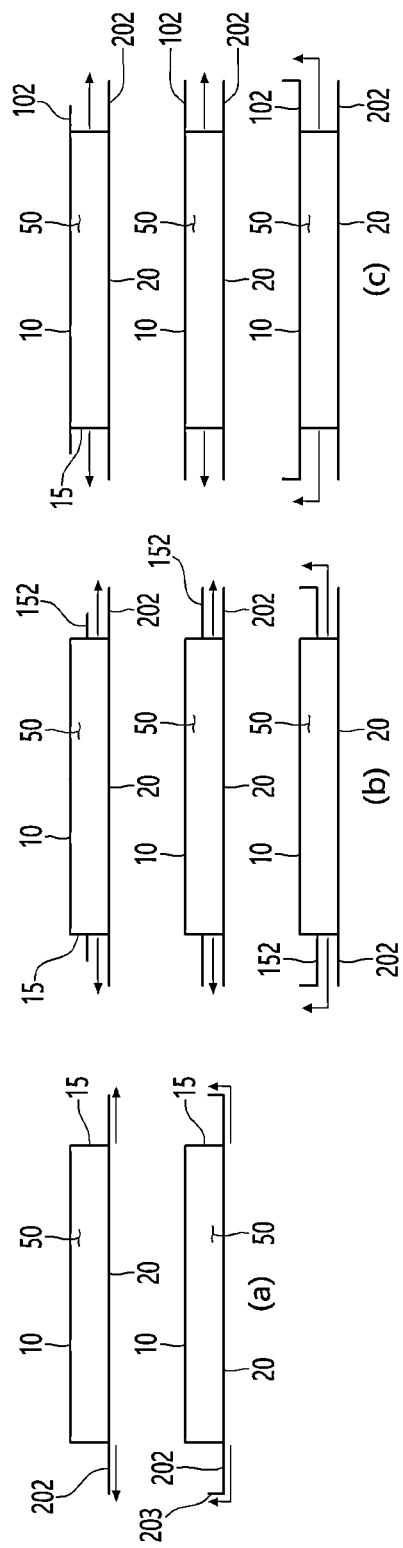
[Figure 9]

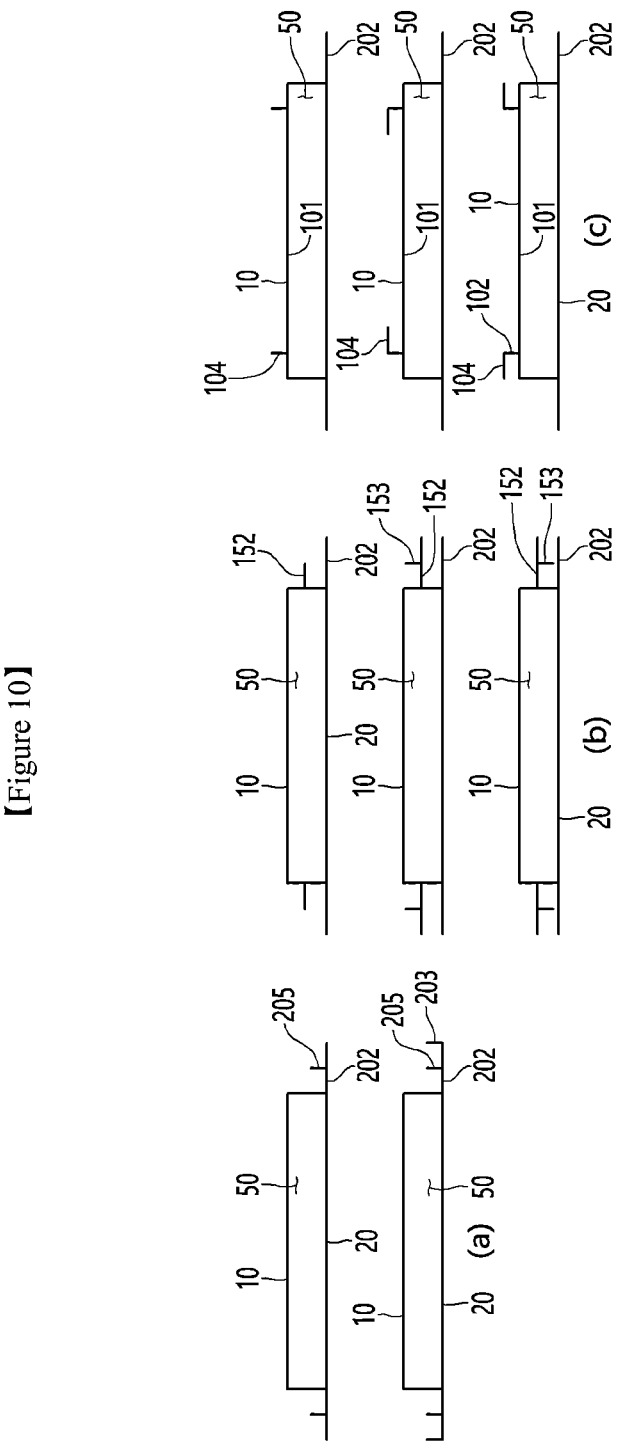
[Figure 10]

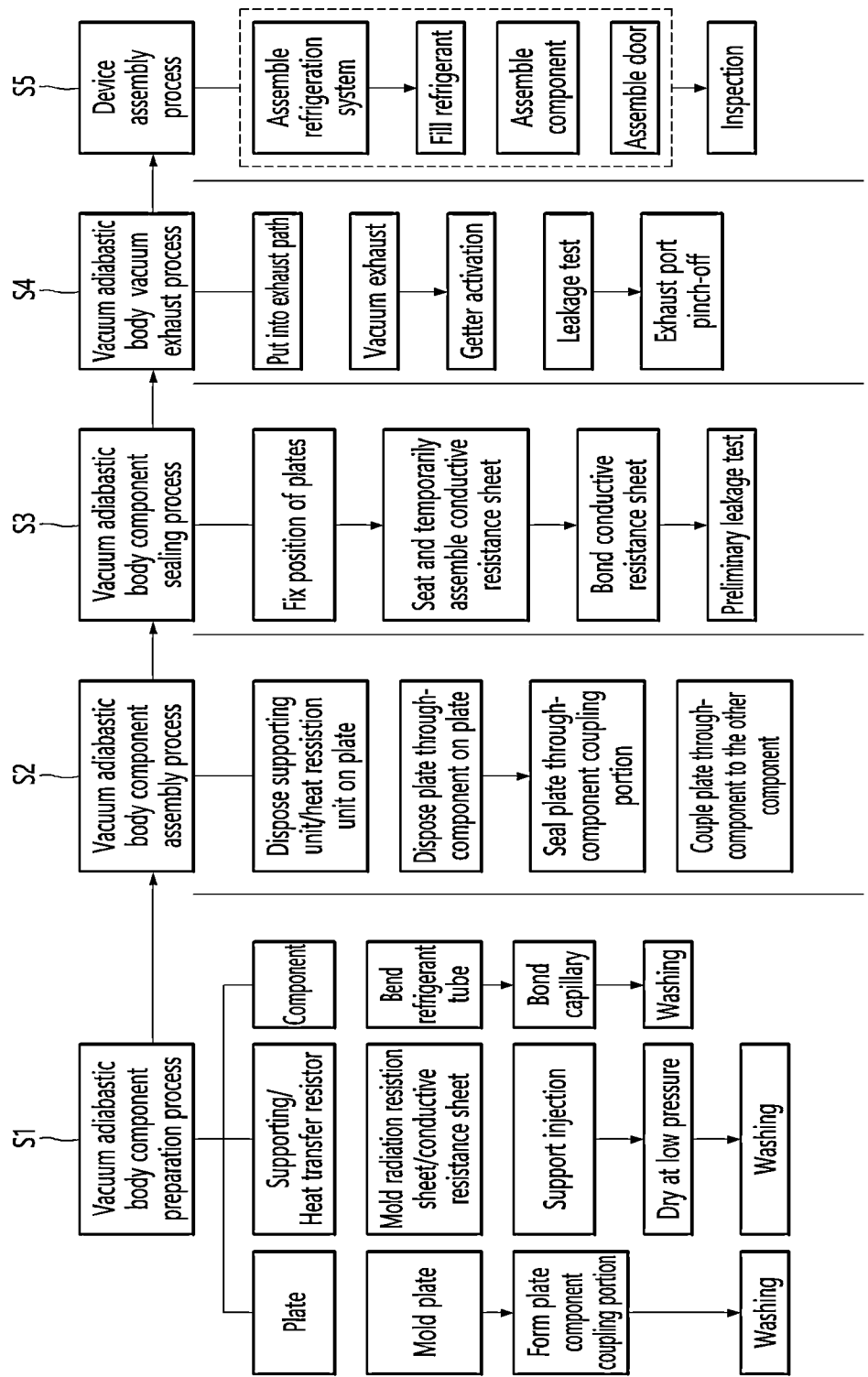
[Figure 11]

[Fig. 12]
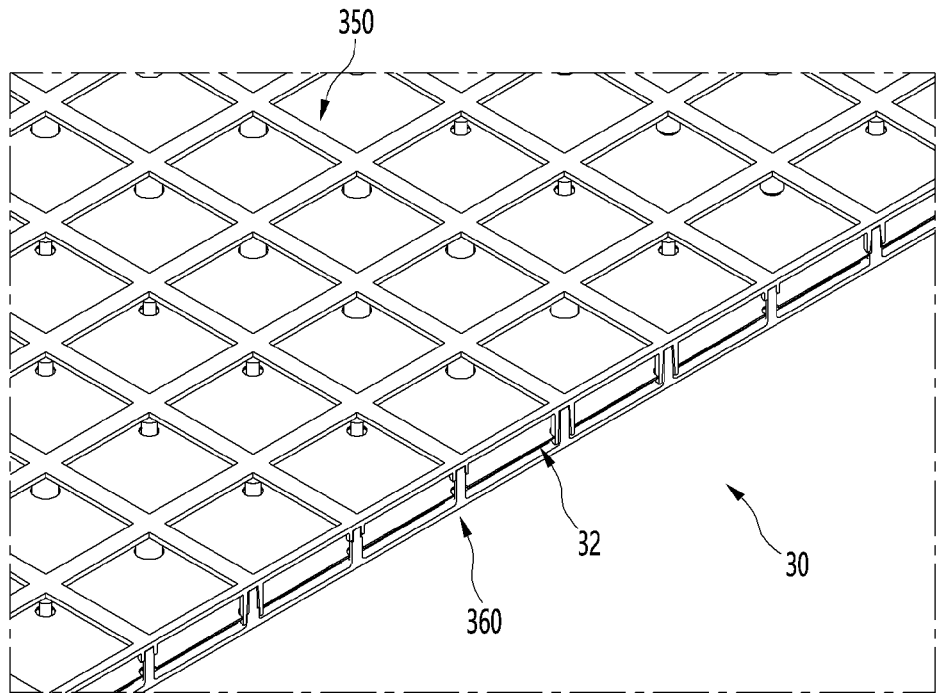
[Fig. 13]
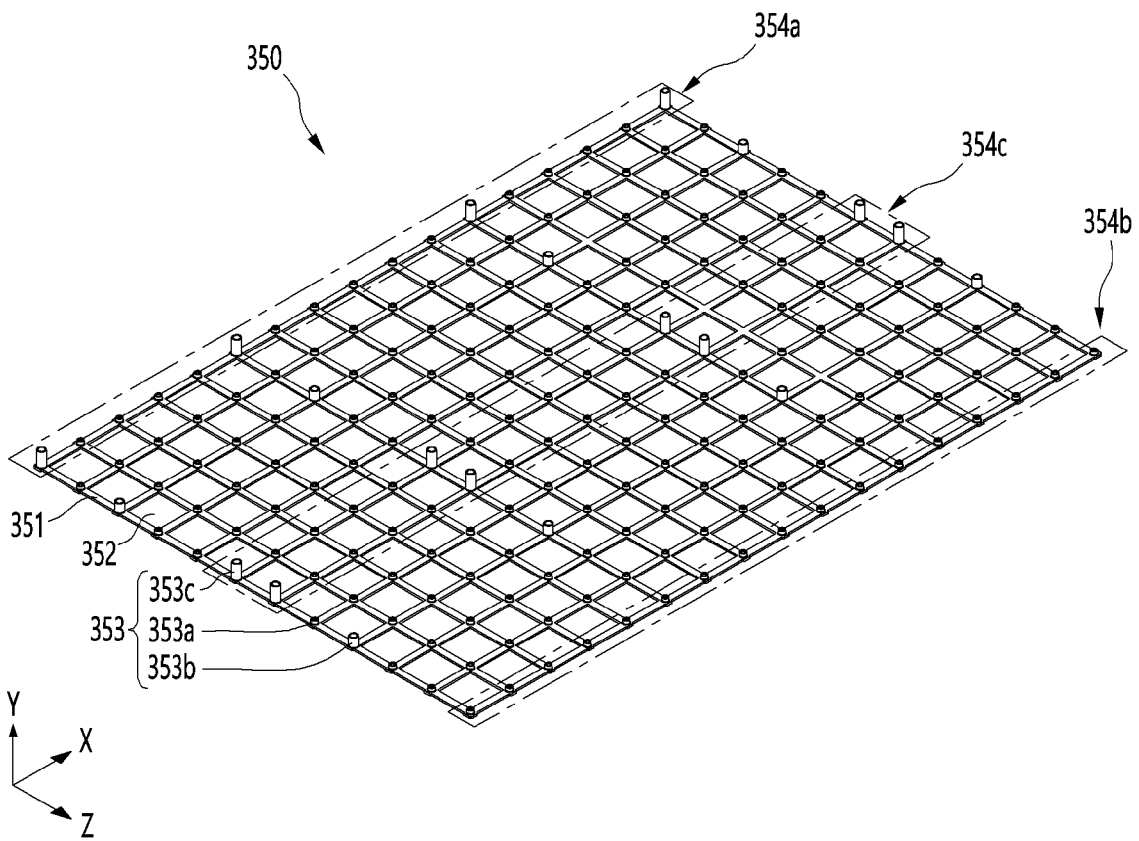

[Fig. 14]
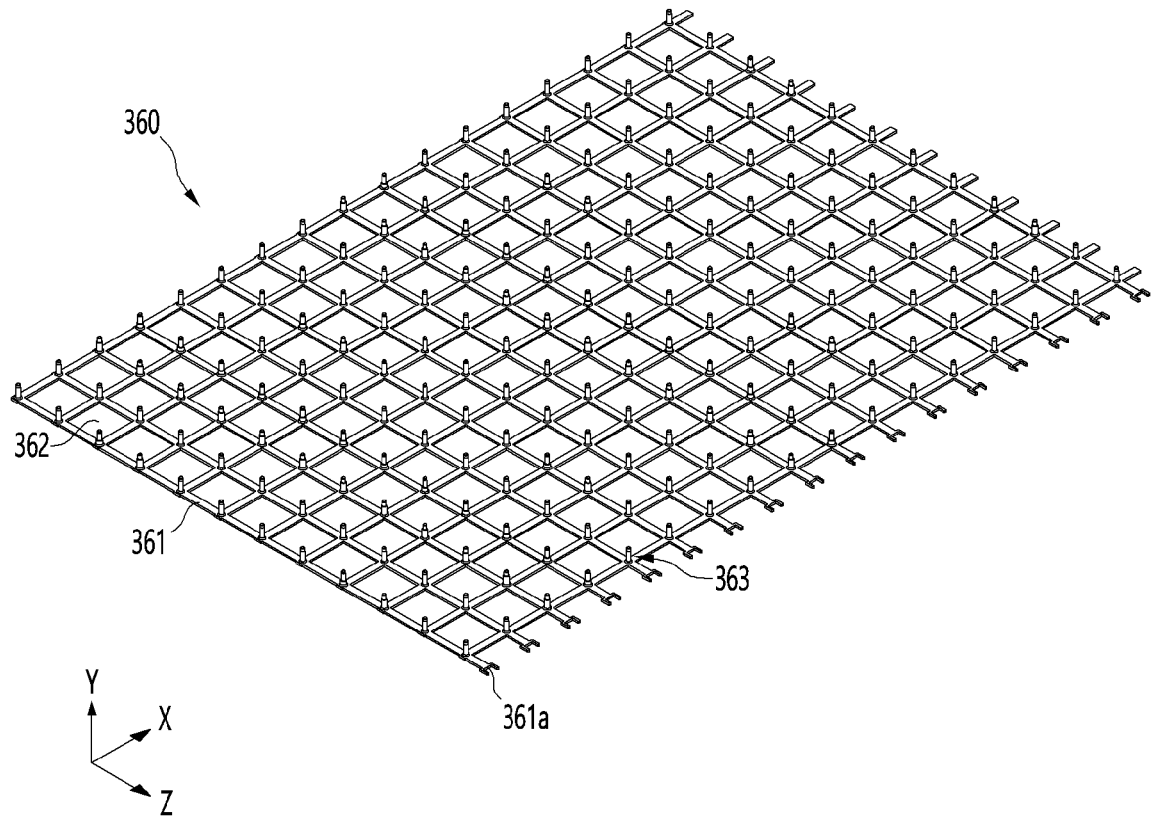
[Fig. 15]
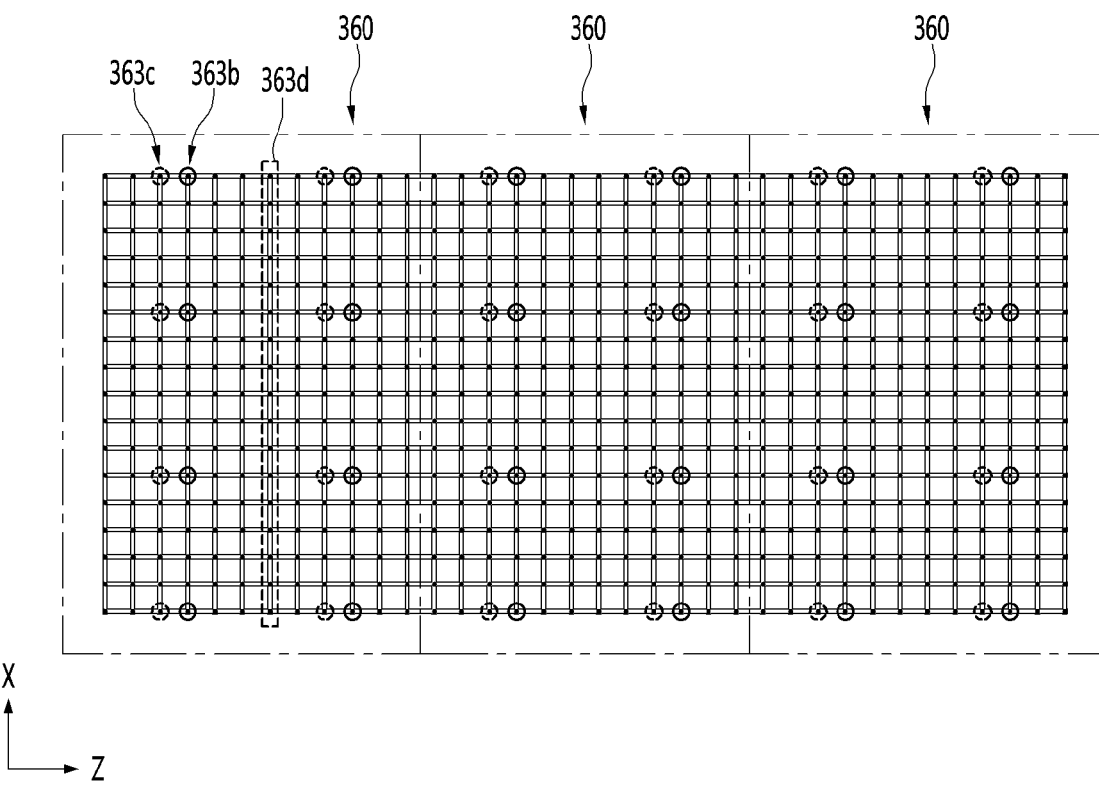

[Fig. 16]
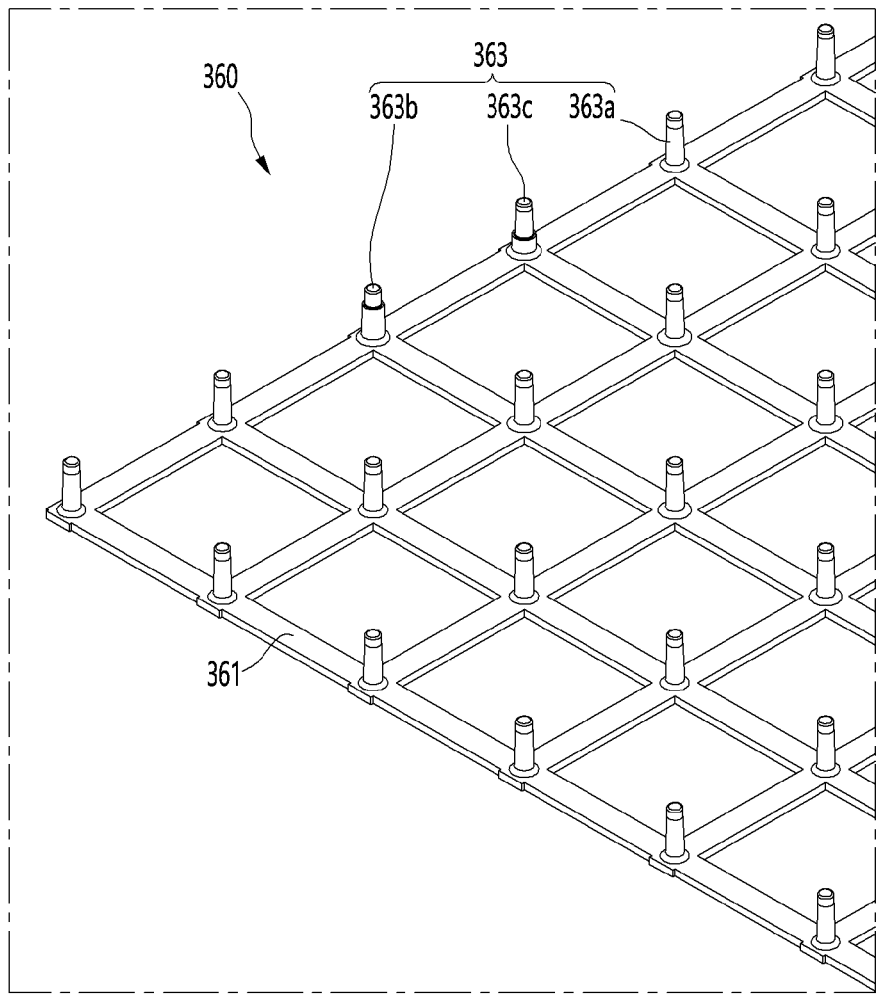
[Fig. 17]
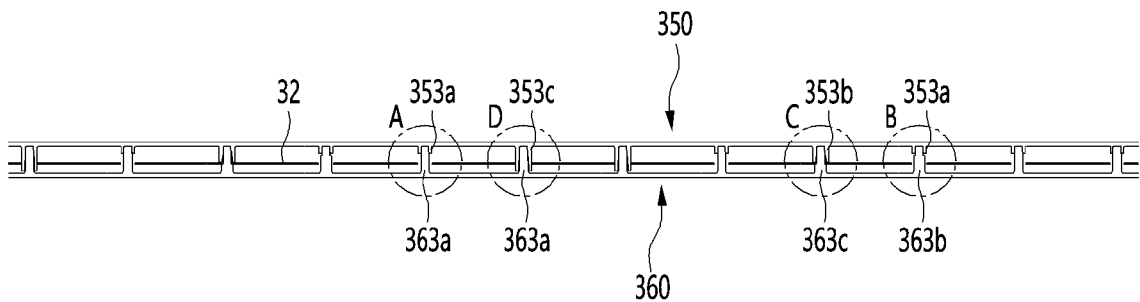

[Fig. 18]
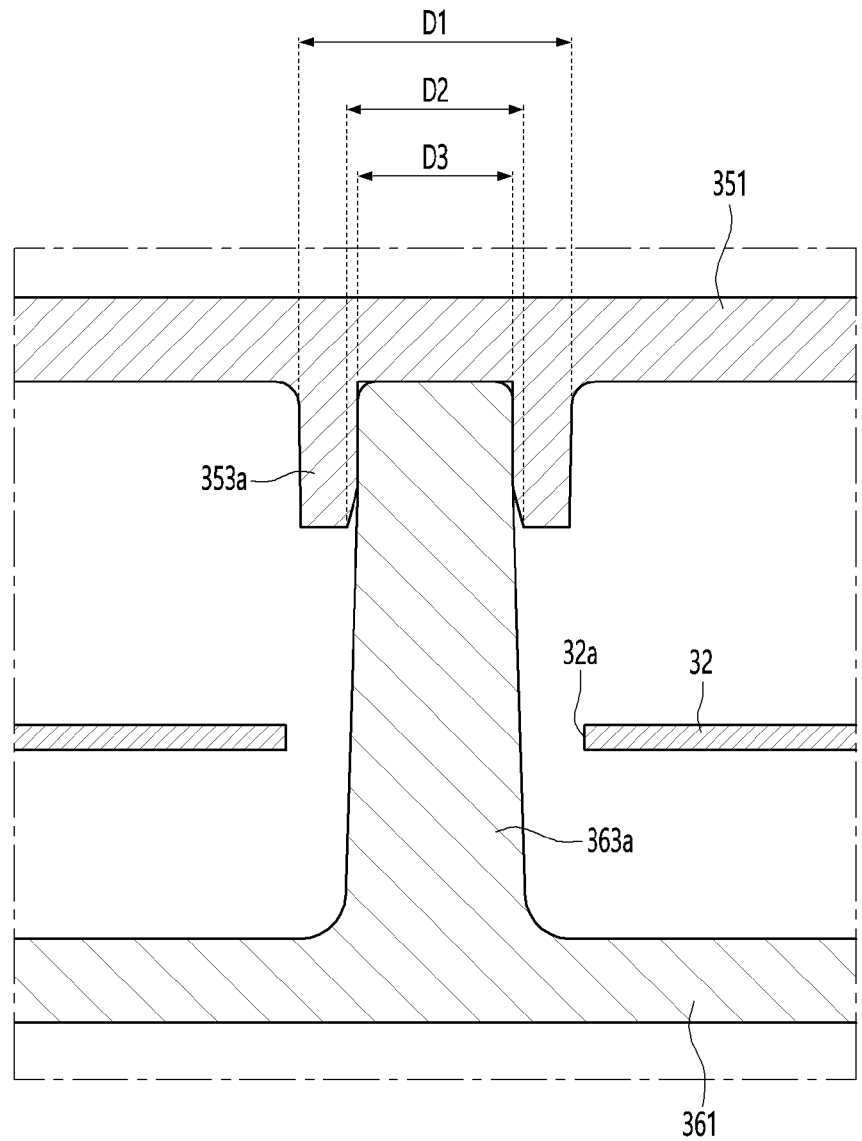

[Fig. 19]
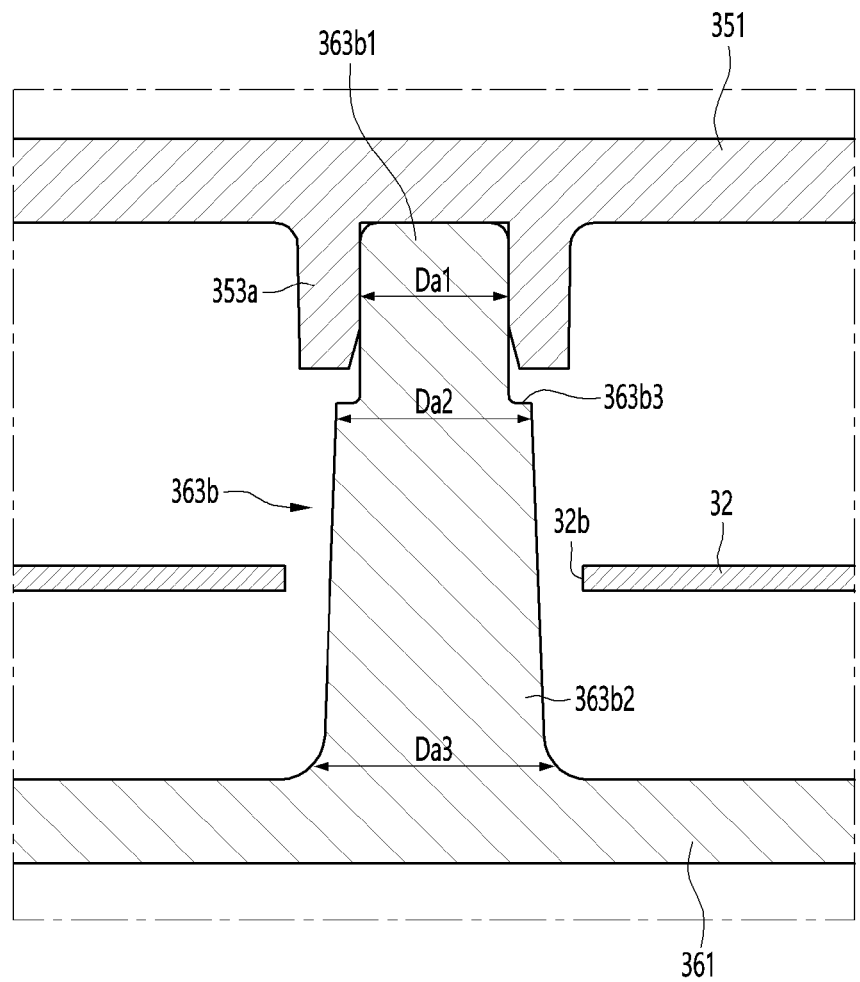

[Fig. 20]
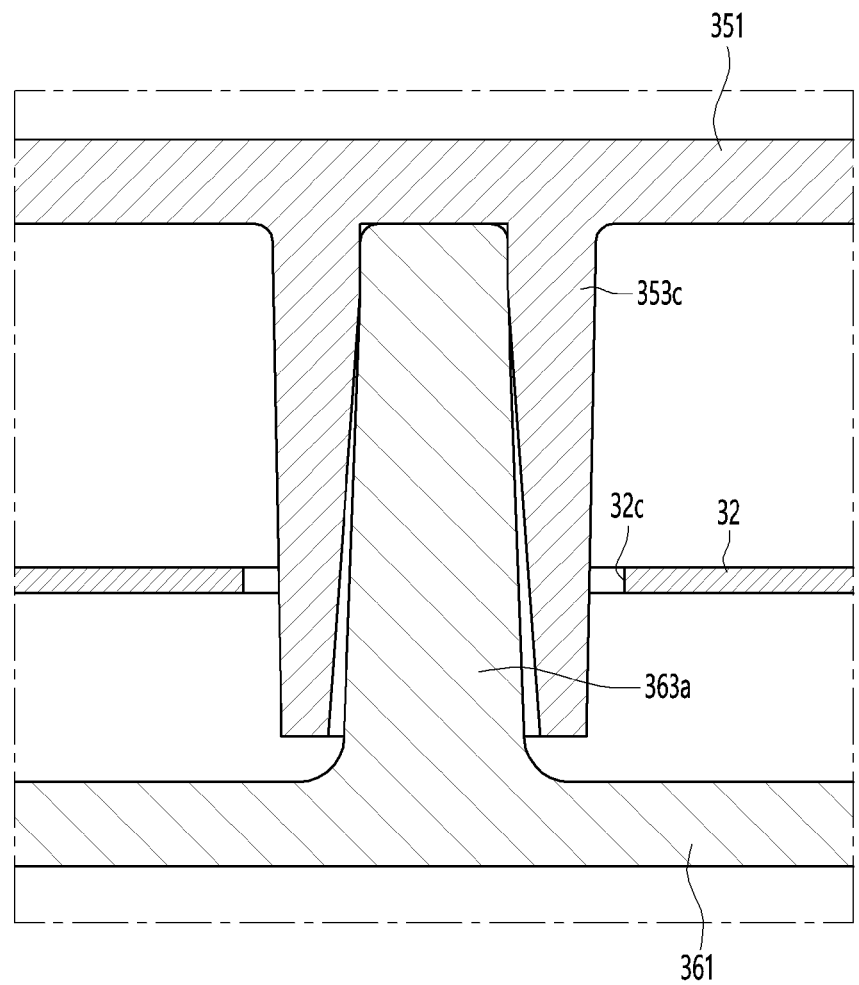

[Fig. 21]
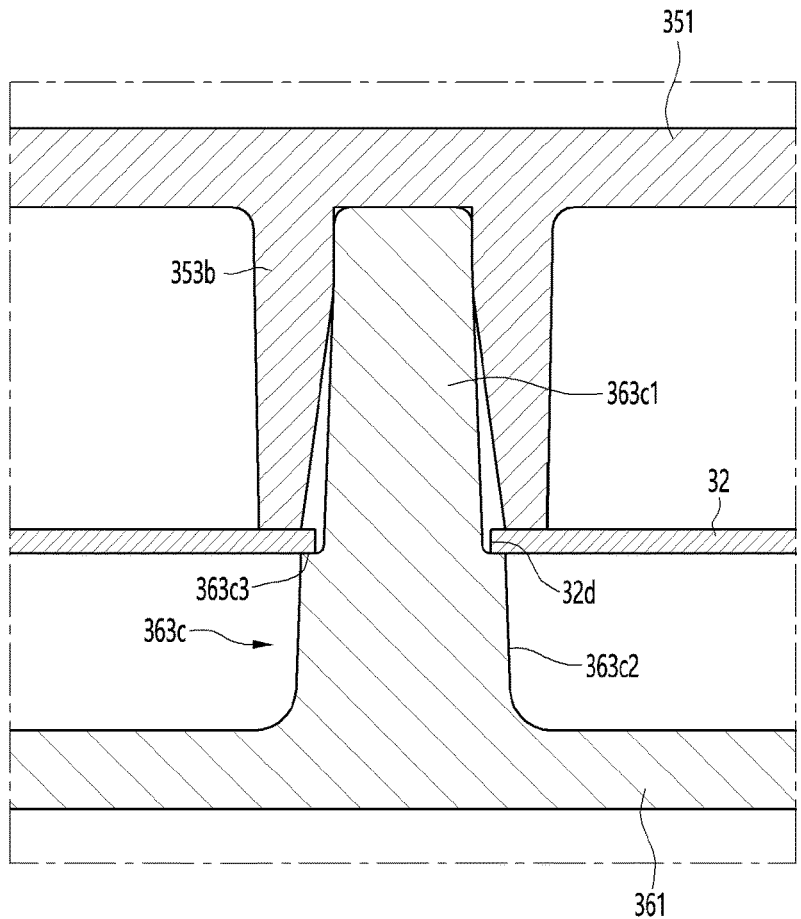
[Fig. 22]
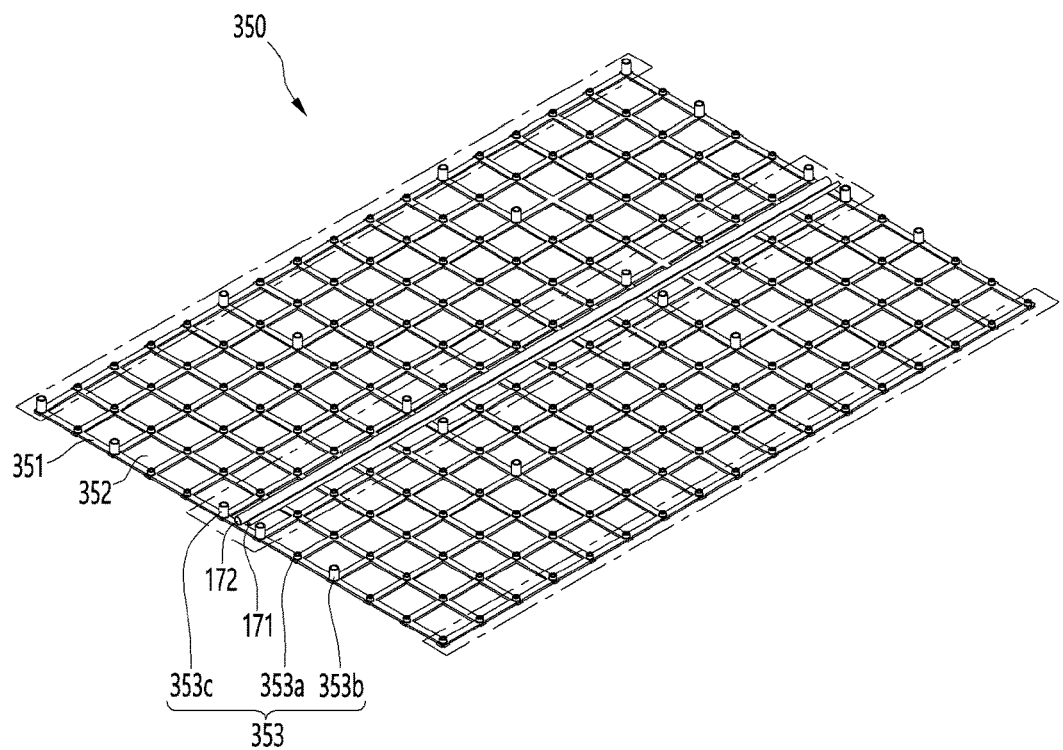

[Fig. 23]
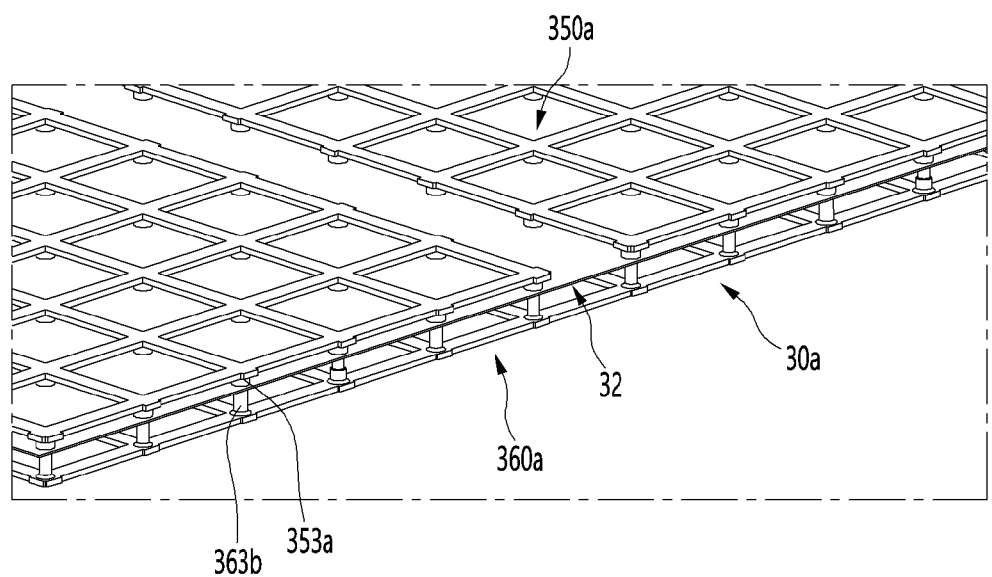

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2021/015521, filed Nov. 1, 2021, which claims priority to Korean Patent Application No. 10-2020-0144779, filed Nov. 2, 2020, whose entire disclosures are hereby incorporated by reference.

TECHNICAL FIELD

The present disclosure relates to a vacuum adiabatic body and a refrigerator.

BACKGROUND ART

Adiabatic performance can be improved by constructing an adiabatic wall with vacuum. At least a portion of the internal space is made of vacuum, and a device for forming to obtain an adiabatic effect may be referred to as a vacuum adiabatic body.

The applicant has developed a technology to obtain a vacuum adiabatic body that can be used in various devices and home appliances and disclosed a refrigerator having a vacuum space of Korean Application No. 10-2011-0113413 (Publication No. 10-2013-0048527).

The refrigerator includes a body having a storage space in which a predetermined stored items can be accommodated, wherein the body includes an inner case in which the storage space is formed; an outer case accommodating the inner case and disposed to be spaced apart from the inner case by a predetermined gap; a vacuum space provided between the inner case and the outer case, the inside of which is sealed and maintained in a vacuum state, to perform an adiabatic action between the inner case and the outer case; a first support plate provided on one of the surfaces facing each other of the inner case and the outer case; and a plurality of spacers which are fixedly disposed on the first support plate and support to maintain a gap between the inner case and the outer case.

The body further includes a second support plate provided on the other of the surfaces facing each other of the inner case and the outer case and disposed to face the first support plate.

The second support plate includes a plurality of grooves formed so that the end portions of the plurality of spaces are inserted into the inner surface thereof.

In this prior document, the first support plate only includes spacers of the same shape, and a specific technique for reducing heat transfer between the support plates is not disclosed.

DISCLOSURE OF INVENTION

Technical Problem

This embodiment proposes a vacuum adiabatic body and a refrigerator that can easily install the radiation resistance sheet on the support.

Optionally or additionally, the present embodiment proposes a vacuum adiabatic body and a refrigerator in which the impact noise between the radiation resistance sheet and the bar is reduced by vibration.

Optionally or additionally, the present embodiment proposes a vacuum adiabatic body and a refrigerator in which heat conduction by the radiation resistance sheet can be minimized.

In addition to the examples presented above, the present disclosure proposes specific solutions and means for solving them in [Technical Solution] and [Mode for Invention].

Solution to Problem

A vacuum adiabatic body according to an aspect may include a first plate, a second plate, a seal configured to seal the first plate and the second plate to provide a vacuum space, and a support configured to maintain the vacuum space.

Optionally, the support may include a first support having a first support plate formed in a grid shape, and a plurality of spacer coupling portions configured to protrude from the first support plate. Optionally, the support may include a second support having a second support plate formed in a grid shape, and a plurality of spacers configured to protrude from the second support plate and coupled to each of the plurality of spacer coupling portions to form a plurality of bars together with the plurality of spacer coupling portions. Optionally, the support may include a radiation resistance sheet supported by a portion of the plurality of bars and spaced apart from at least one of the first support plate and the second support plate.

Optionally, the plurality of spacer coupling portions may be arranged in a plurality of columns and a plurality of rows in the first support plate.

Optionally, only a spacer coupling portion having the same shape may be provided in some columns of a plurality of columns, and spacer coupling portions having a different shape are provided in some other columns.

Optionally, the number of columns including only the spacer coupling portion of the same type may be greater than the number of columns including the spacer coupling portion of the different type.

Optionally, the spacer coupling portions having the same shape may be provided in some rows of the plurality of rows, and the spacer coupling portions having different shapes are provided in some other rows.

Optionally, the number of rows including only the spacer coupling portion of the same type may be greater than the number of rows including the spacer coupling portion of the different type.

Optionally, the plurality of spacer coupling portions may include a first spacer coupling portion, a second spacer coupling portion, and a third spacer coupling portion, which are divided by height. Alternatively, the second spacer coupling portion may be longer than the first spacer coupling portion, and the third spacer coupling portion may be longer than the second spacer coupling portion.

Optionally, only the first spacer coupling portion may be provided in some rows of the plurality of rows. Alternatively, the first spacer coupling portion and the second spacer coupling portion may be provided in some other rows of the plurality of rows. Alternatively, the first spacer coupling portion and the third spacer coupling portion may be provided in another some row of the plurality of rows.

Optionally, at least two rows including the third spacer coupling portion may be disposed adjacent to each other.

Optionally, in a row including the first spacer coupling portion and the second spacer coupling portion, at least one first spacer coupling portion may be positioned between two second spacer coupling portions.

Optionally, in a row including the first spacer coupling portion and the third spacer coupling portion, at least one first spacer coupling portion may be positioned between two third spacer coupling portions.

Optionally, only the first spacer coupling portion may be provided in some rows of the plurality of rows. Alternatively, the first spacer coupling portion, the second spacer coupling portion, and the third spacer coupling portion may be provided in some other rows of the plurality of rows.

Optionally, in a row including the first spacer coupling portion to the third spacer coupling portion, at least two third spacer coupling portions may be located adjacent to each other.

Optionally, in a row including the first spacer coupling portion to the third spacer coupling portion, at least one first spacer coupling portion may be provided between the second spacer coupling portion and the third spacer coupling portion.

Optionally, the plurality of spacers may include a first spacer, a second spacer, and a third spacer, which have different shapes.

Optionally, the first spacer may be coupled to the first spacer coupling portion to define a first bar. Alternatively, the second spacer may be coupled to the first spacer coupling portion to define a second bar. Alternatively, the third spacer may be coupled to the second spacer coupling portion to define a third bar. Alternatively, the first spacer may be coupled to the third spacer coupling portion to define a fourth bar.

Optionally, the first bar to the third bar may not support the radiation resistance sheet, and the fourth bar may support the radiation resistance sheet.

A vacuum adiabatic body according to another aspect support may include a first support having a first support plate formed in a grid shape, and a plurality of spacer coupling portions configured to protrude from the first support plate. Optionally, the support may include a second support having a second support plate formed in a grid shape, and a plurality of spacers configured to protrude from the second support plate and coupled to each of the plurality of spacer coupling portions to form a plurality of bars together with the plurality of spacer coupling portions. Optionally, the support may include a radiation resistance sheet supported by a portion of the plurality of bars and spaced apart from at least one of the first support plate and the second support plate.

Optionally, the plurality of spacers may be arranged in a plurality of columns and a plurality of rows in the second support plate.

Optionally, only a spacer having the same shape may be provided in some columns of a plurality of columns, and a spacer having a different shape are provided in some other columns.

Optionally, the number of columns including only the spacer coupling portion of the same type may be greater than the number of columns including the spacer coupling portion of the different type.

Optionally, the spacers having the same shape may be provided in some rows of the plurality of rows, and the spacers having different shapes may be provided in some other rows of the plurality of rows.

Optionally, the number of rows including only the spacers of the same type may be greater than the number of rows including the spacers of the different types.

Optionally, the plurality of spacers may include a first spacer, a second spacer, and a third spacer, which are distinguished by shape.

Optionally, only the first spacer may be provided in some rows of the plurality of rows. Alternatively, the first spacer and the second spacer may be provided in some other rows of the plurality of rows. Alternatively, the first spacer and the third spacer may be provided in another some row of the plurality of rows.

Optionally, the number of rows including only the first spacer may be largest.

Optionally, a row including the first spacer and the second spacer and a row including the first spacer and the third spacer may be positioned adjacent to each other.

Optionally, only the first spacer may be provided in some columns of the plurality of columns. Alternatively, the first spacer, the second spacer, and the third spacer may be provided in some other columns of the plurality of columns.

Optionally, in a column including the first spacer to the third spacer, the second spacer and the third spacer may be positioned adjacent to each other.

Optionally, in a column including the first spacer coupling portion to the third spacer coupling portion, at least one first spacer may be provided between the second spacer and the third spacer.

Optionally, the plurality of spacer coupling portions may include a first spacer coupling portion, a second spacer coupling portion, and a third spacer coupling portion, which are divided by height. Alternatively, the second spacer coupling portion may be longer than the first spacer coupling portion, and the third spacer coupling portion may be longer than the second spacer coupling portion.

Optionally, the first spacer may be coupled to the first spacer coupling portion to define a first bar. Alternatively, the second spacer may be coupled to the first spacer coupling portion to define a second bar. Alternatively, the third spacer may be coupled to the second spacer coupling portion to define a third bar. Alternatively, the first spacer may be coupled to the third spacer coupling portion to define a fourth bar. Alternatively, the first bar to the third bar may not support the radiation resistance sheet, and the fourth bar may support the radiation resistance sheet.

Optionally, the refrigerator according to another aspect may include the vacuum adiabatic body described above.

Advantageous Effects of Invention

According to the proposed embodiment, since the position of the radiation resistance sheet is fixed when the first support is coupled to the second support after the spacer is seated on the second support including the spacer to pass through the radiation resistance sheet, there is an advantage that the radiation resistance sheet can be easily installed on the support.

In the present embodiment, when the bar supporting the radiation resistance sheet supports both surfaces of the radiation resistance sheet, since the impact of the radiation resistance sheet and the bar supporting the radiation resistance sheet is prevented by vibration, there is advantage that the impact noise is reduced.

In this embodiment, since a bar other than a bar supporting the radiation resistance sheet of the plurality of types of bars is spaced apart from the radiation resistance sheet, there is an advantage that heat conduction by the radiation resistance sheet can be minimized.

BRIEF DESCRIPTION OF DRAWINGS

FIG. 1 is a perspective view illustrating a refrigerator according to an embodiment, FIG. 2 is a view schematically illustrating a vacuum adiabatic body used for a body and a door of a refrigerator, FIG. 3 is a view illustrating an embodiment of a support for maintaining a vacuum space, FIG. 4 is a view for explaining an embodiment of a vacuum adiabatic body centering on a heat transfer resistor, FIG. 5 is a graph for observing the process of evacuating the inside of the vacuum adiabatic body with time and pressure when the support is used, FIG. 6 is a graph comparing vacuum pressure and gas conductivity, FIG. 7 is a view illustrating various embodiments of a vacuum space, FIG. 8 is a view for explaining an additional adiabatic body, FIG. 9 is a view for explaining a heat transfer path between first and second plates having different temperatures, FIG. 10 is a view for explaining a branch portion on a heat transfer path between first and second plates having different temperatures, FIG. 11 is a view for explaining a method for manufacturing a vacuum adiabatic body, FIG. 12 is a perspective view illustrating a support according to another embodiment, FIG. 13 is a perspective view illustrating a first support, FIG. 14 is a perspective view illustrating a second support, FIG. 15 is a view illustrating a state in which a plurality of second supports are connected, FIG. 16 is a view specifically illustrating the structure of spacers of the second support, FIG. 17 is a cross-sectional view illustrating a state in which the first support and the second support are coupled, FIG. 18 is an enlarged view illustrating part A of FIG. 17, FIG. 19 is an enlarged view illustrating part B of FIG. 17, FIG. 20 is an enlarged view illustrating a part C of FIG. 17, FIG. 21 is an enlarged view illustrating part D of FIG. 17, FIG. 22 is a view illustrating a state in which a heat exchange conduit is disposed on the first support of FIG. 13, and FIG. 23 is a perspective view illustrating a support in another embodiment.

MODE FOR THE INVENTION

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention. The present invention may have many embodiments in which the idea is implemented, and in each embodiment, any portion may be replaced with a corresponding portion or a portion having a related action according to another embodiment. The present invention may be any one of the examples presented below or a combination of two or more examples.

The present disclosure relates to a vacuum adiabatic body including a first plate; a second plate; a vacuum space defined between the first and second plates; and a seal providing the vacuum space that is in a vacuum state. The vacuum space may be a space in a vacuum state provided in an internal space between the first plate and the second plate. The seal may seal the first plate and the second plate to provide the internal space provided in the vacuum space. The vacuum adiabatic body may optionally include a side plate connecting the first plate to the second plate. In the present disclosure, the expression "plate" may mean at least one of the first and second plates or the side plate. At least a portion of the first and second plates and the side plate may be integrally provided, or at least portions may be sealed to each other. Optionally, the vacuum adiabatic body may include a support that maintains the vacuum space. The vacuum adiabatic body may selectively include a thermal insulator that reduces an amount of heat transfer between a first space provided in vicinity of the first plate and a second space provided in vicinity of the second plate or reduces an amount of heat transfer between the first plate and the second plate. Optionally, the vacuum adiabatic body may include a component coupling portion provided on at least a portion of the plate. Optionally, the vacuum adiabatic body may include another adiabatic body. Another adiabatic body may be provided to be connected to the vacuum adiabatic body. Another adiabatic body may be an adiabatic body having a degree of vacuum, which is equal to or different from a degree of vacuum of the vacuum adiabatic body. Another adiabatic body may be an adiabatic body that does not include a degree of vacuum less than that of the vacuum adiabatic body or a portion that is in a vacuum state therein. In this case, it may be advantageous to connect another object to another adiabatic body.

In the present disclosure, a direction along a wall defining the vacuum space may include a longitudinal direction of the vacuum space and a height direction of the vacuum space. The height direction of the vacuum space may be defined as any one direction among virtual lines connecting the first space to the second space to be described later while passing through the vacuum space. The longitudinal direction of the vacuum space may be defined as a direction perpendicular to the set height direction of the vacuum space. In the present disclosure, that an object A is connected to an object B means that at least a portion of the object A and at least a portion of the object B are directly connected to each other, or that at least a portion of the object A and at least a portion of the object B are connected to each other through an intermedium interposed between the objects A and B. The intermedium may be provided on at least one of the object A or the object B. The connection may include that the object A is connected to the intermedium, and the intermedium is connected to the object B. A portion of the intermedium may include a portion connected to either one of the object A and the object B. The other portion of the intermedium may include a portion connected to the other of the object A and the object B. As a modified example, the connection of the object A to the object B may include that the object A and the object B are integrally prepared in a shape connected in the above-described manner. In the present disclosure, an embodiment of the connection may be support, combine, or a seal, which will be described later. In the present disclosure, that the object A is supported by the object B means that the object A is restricted in movement by the object B in one or more of the +X, −X, +Y, −Y, +Z, and −Z axis directions. In the present invention, an embodiment of the support may be the combine or seal, which will be described later. In the present invention, that the object A is combined with the object B may define that the object A is restricted in movement by the object B in one or more of the X, Y, and Z-axis directions. In the present disclosure, an embodiment of the combining may be the sealing to be described later. In the present disclosure, that the object A is sealed to the object B may define a state in which movement of a fluid is not allowed at the portion at which the object A and the object B are connected. In the present disclosure, one or more objects, i.e., at least a portion of the object A and the object B, may be defined as including a portion of the object A, the whole of the object A, a portion of the object B, the whole of the object B, a portion of the object A and a portion of the object B, a portion of the object A and the whole of the object B, the whole of the object A and a portion of the object B, and the whole of the object A and the whole of the object B. In the present disclosure, that the plate A may be a wall defining the space A may be defined as that at least a portion of the plate A may be a wall defining at least a portion of the space A. That is, at least a portion of the plate A may be a wall forming the space A, or the plate A may be a wall forming at least a portion of the space A. In the present disclosure, a central portion of the object may be defined as a central portion among three divided portions when the object is divided into three sections based on the longitudinal direction of the object. A periphery of the object may be defined as a portion disposed at a left or right side of the central portion among the three divided portions. The periphery of the object may include a surface that is in contact with the central portion and a surface opposite thereto. The opposite side may be defined as a border or edge of the object. Examples of the object may include a vacuum adiabatic body, a plate, a heat transfer resistor, a support, a vacuum space, and various components to be introduced in the present disclosure. In the present disclosure, a degree of heat transfer resistance may indicate a degree to which an object resists heat transfer and may be defined as a value determined by a shape including a thickness of the object, a material of the object, and a processing method of the object. The degree of the heat transfer resistance may be defined as the sum of a degree of conduction resistance, a degree of radiation resistance, and a degree of convection resistance. The vacuum adiabatic body according to the present disclosure may include a heat transfer path defined between spaces having different temperatures, or a heat transfer path defined between plates having different temperatures. For example, the vacuum adiabatic body according to the present disclosure may include a heat transfer path through which cold is transferred from a low-temperature plate to a high-temperature plate. In the present disclosure, when a curved portion includes a first portion extending in a first direction and a second portion extending in a second direction different from the first direction, the curved portion may be defined as a portion that connects the first portion to the second portion (including 90 degrees).

In the present disclosure, the vacuum adiabatic body may optionally include a component coupling portion. The component coupling portion may be defined as a portion provided on the plate to which components are connected to each other. The component connected to the plate may be defined as a penetration portion disposed to pass through at least a portion of the plate and a surface component disposed to be connected to a surface of at least a portion of the plate. At least one of the penetration component or the surface component may be connected to the component coupling portion. The penetration component may be a component that defines a path through which a fluid (electricity, refrigerant, water, air, etc.) passes mainly. In the present disclosure, the fluid is defined as any kind of flowing material. The fluid includes moving solids, liquids, gases, and electricity.

For example, the component may be a component that defines a path through which a refrigerant for heat exchange passes, such as a suction line heat exchanger (SLHX) or a refrigerant tube. The component may be an electric wire that supplies electricity to an apparatus. As another example, the component may be a component that defines a path through which air passes, such as a cold duct, a hot air duct, and an exhaust port. As another example, the component may be a path through which a fluid such as coolant, hot water, ice, and defrost water pass. The surface component may include at least one of a peripheral adiabatic body, a side panel, injected foam, a pre-prepared resin, a hinge, a latch, a basket, a drawer, a shelf, a light, a sensor, an evaporator, a front decor, a hotline, a heater, an exterior cover, or another adiabatic body.

As an example to which the vacuum adiabatic body is applied, the present disclosure may include an apparatus having the vacuum adiabatic body. Examples of the apparatus may include an appliance. Examples of the appliance may include home appliances including a refrigerator, a cooking appliance, a washing machine, a dishwasher, and an air conditioner, etc. As an example in which the vacuum adiabatic body is applied to the apparatus, the vacuum adiabatic body may constitute at least a portion of a body and a door of the apparatus. As an example of the door, the vacuum adiabatic body may constitute at least a portion of a general door and a door-in-door (DID) that is in direct contact with the body. Here, the door-in-door may mean a small door placed inside the general door. As another example to which the vacuum adiabatic body is applied, the present disclosure may include a wall having the vacuum adiabatic body. Examples of the wall may include a wall of a building, which includes a window.

Hereinafter, the present disclosure will be described in detail with reference to the accompanying drawings. Each of the drawings accompanying the embodiment may be different from, exaggerated, or simply indicated from an actual article, and detailed components may be indicated with simplified features. The embodiment should not be interpreted as being limited only to the size, structure, and shape presented in the drawings. In the embodiments accompanying each of the drawings, unless the descriptions conflict with each other, some configurations in the drawings of one embodiment may be applied to some configurations of the drawings in another embodiment, and some structures in one embodiment may be applied to some structures in another embodiment. In the description of the drawings for the embodiment, the same reference numerals may be assigned to different drawings as reference numerals of specific components constituting the embodiment. Components having the same reference number may perform the same function. For example, the first plate constituting the vacuum adiabatic body has a portion corresponding to the first space throughout all embodiments and is indicated by reference number 10. The first plate may have the same number for all embodiments and may have a portion corresponding to the first space, but the shape of the first plate may be different in each embodiment. Not only the first plate, but also the side plate, the second plate, and another adiabatic body may be understood as well.

FIG. 1 is a perspective view of a refrigerator according to an embodiment, and FIG. 2 is a schematic view illustrating a vacuum adiabatic body used for a body and a door of the refrigerator. Referring to FIG. 1, the refrigerator 1 includes a main body 2 provided with a cavity 9 capable of storing storage goods and a door 3 provided to open and close the main body 2. The door 3 may be rotatably or slidably disposed to open or close the cavity 9. The cavity 9 may provide at least one of a refrigerating compartment and a freezing compartment. A cold source that supplies cold to the cavity may be provided. For example, the cold source may be an evaporator 7 that evaporates the refrigerant to take heat. The evaporator 7 may be connected to a compressor 4 that compresses the refrigerant evaporated to the cold source. The evaporator 7 may be connected to a condenser 5 that condenses the compressed refrigerant to the cold source. The evaporator 7 may be connected to an expander 6 that expands the refrigerant condensed in the cold source. A fan corresponding to the evaporator and the condenser may be provided to promote heat exchange. As another example, the cold source may be a heat absorption surface of a thermoelectric element. A heat absorption sink may be connected to the heat absorption surface of the thermoelectric element. A heat sink may be connected to a heat radiation surface of the thermoelectric element. A fan corresponding to the heat absorption surface and the heat generation surface may be provided to promote heat exchange.

Referring to FIG. 2, plates 10, 15, and 20 may be walls defining the vacuum space. The plates may be walls that partition the vacuum space from an external space of the vacuum space. An example of the plates is as follows. The present disclosure may be any one of the following examples or a combination of two or more examples.

The plate may be provided as one portion or may be provided to include at least two portions connected to each other. As a first example, the plate may include at least two portions connected to each other in a direction along a wall defining the vacuum space. Any one of the two portions may include a portion (e.g., a first portion) defining the vacuum space. The first portion may be a single portion or may include at least two portions that are sealed to each other. The other one of the two portions may include a portion (e.g., a second portion) extending from the first portion of the first plate in a direction away from the vacuum space or extending in an inner direction of the vacuum space. As a second example, the plate may include at least two layers connected to each other in a thickness direction of the plate. Any one of the two layers may include a layer (e.g., the first portion) defining the vacuum space. The other one of the two layers may include a portion (e.g., the second portion) provided in an external space (e.g., a first space and a second space) of the vacuum space. In this case, the second portion may be defined as an outer cover of the plate. The other one of the two layers may include a portion (e.g., the second portion) provided in the vacuum space. In this case, the second portion may be defined as an inner cover of the plate.

The plate may include a first plate 10 and a second plate 20. One surface of the first plate (the inner surface of the first plate) provides a wall defining the vacuum space, and the other surface (the outer surface of the first plate) of the first plate A wall defining the first space may be provided. The first space may be a space provided in the vicinity of the first plate, a space defined by the apparatus, or an internal space of the apparatus. In this case, the first plate may be referred to as an inner case. When the first plate and the additional member define the internal space, the first plate and the additional member may be referred to as an inner case. The inner case may include two or more layers. In this case, one of the plurality of layers may be referred to as an inner panel. One surface of the second plate (the inner surface of the second plate) provides a wall defining the vacuum space, and the other surface (the outer surface of the first plate) of the second plate A wall defining the second space may be provided. The second space may be a space provided in vicinity of the second plate, another space defined by the apparatus, or an external space of the apparatus. In this case, the second plate may be referred to as an outer case. When the second plate and the additional member define the external space, the second plate and the additional member may be referred to as an outer case. The outer case may include two or more layers. In this case, one of the plurality of layers may be referred to as an outer panel. The second space may be a space having a temperature higher than that of the first space or a space having a temperature lower than that of the first space. Optionally, the plate may include a side plate 15. In FIG. 2, the side plate may also perform a function of a conductive resistance sheet 60 to be described later, according to the disposition of the side plate. The side plate may include a portion extending in a height direction of a space defined between the first plate and the second plate or a portion extending in a height direction of the vacuum space. One surface of the side plate may provide a wall defining the vacuum space, and the other surface of the side plate may provide a wall defining an external space of the vacuum space. The external space of the vacuum space may be at least one of the first space or the second space or a space in which another adiabatic body to be described later is disposed. The side plate may be integrally provided by extending at least one of the first plate or the second plate or a separate component connected to at least one of the first plate or the second plate.

The plate may optionally include a curved portion. In the present disclosure, the plate including a curved portion may be referred to as a bent plate. The curved portion may include at least one of the first plate, the second plate, the side plate, between the first plate and the second plate, between the first plate and the side plate, or between the second plate and the side plate. The plate may include at least one of a first curved portion or a second curved portion, an example of which is as follows. First, the side plate may include the first curved portion. A portion of the first curved portion may include a portion connected to the first plate. Another portion of the first curved portion may include a portion connected to the second curved portion. In this case, a curvature radius of each of the first curved portion and the second curved portion may be large. The other portion of the first curved portion may be connected to an additional straight portion or an additional curved portion, which are provided between the first curved portion and the second curved portion. In this case, a curvature radius of each of the first curved portion and the second curved portion may be small. Second, the side plate may include the second curved portion. A portion of the second curved portion may include a portion connected to the second plate. The other portion of the second curved portion may include a portion connected to the first curved portion. In this case, a curvature radius of each of the first curved portion and the second curved portion may be large. The other portion of the second curved portion may be connected to an additional straight portion or an additional curved portion, which are provided between the first curved portion and the second curved portion. In this case, a curvature radius of each of the first curved portion and the second curved portion may be small. Here, the straight portion may be defined as a portion having a curvature radius greater than that of the curved portion. The straight portion may be understood as a portion having a perfect plane or a curvature radius greater than that of the curved portion. Third, the first plate may include the first curved portion. A portion of the first curved portion may include a portion connected to the side plate. A portion connected to the side plate may be provided at a position that is away from the second plate at a portion at which the first plate extends in the longitudinal direction of the vacuum space. Fourth, the second plate may include the second curved portion. A portion of the second curved portion may include a portion connected to the side plate. A portion connected to the side plate may be provided at a position that is away from the first plate at a portion at which the second plate extends in the longitudinal direction of the vacuum space. The present disclosure may include a combination of any one of the first and second examples described above and any one of the third and fourth examples described above.

In the present disclosure, the vacuum space 50 may be defined as a third space. The vacuum space may be a space in which a vacuum pressure is maintained. In the present disclosure, the expression that a vacuum degree of A is higher than that of B means that a vacuum pressure of A is lower than that of B.

In the present disclosure, the seal 61 may be a portion provided between the first plate and the second plate. Examples of sealing are as follows. The present disclosure may be any one of the following examples or a combination of two or more examples. The sealing may include fusion welding for coupling the plurality of objects by melting at least a portion of the plurality of objects. For example, the first plate and the second plate may be welded by laser welding in a state in which a melting bond such as a filler metal is not interposed therebetween, a portion of the first and second plates and a portion of the component coupling portion may be welded by high-frequency brazing or the like, or a plurality of objects may be welded by a melting bond that generates heat. The sealing may include pressure welding for coupling the plurality of objects by a mechanical pressure applied to at least a portion of the plurality of objects. For example, as a component connected to the component coupling portion, an object made of a material having a degree of deformation resistance less than that of the plate may be pressure-welded by a method such as pinch-off.

A machine room 8 may be optionally provided outside the vacuum adiabatic body. The machine room may be defined as a space in which components connected to the cold source are accommodated. Optionally, the vacuum adiabatic body may include a port 40. The port may be provided at any one side of the vacuum adiabatic body to discharge air of the vacuum space 50. Optionally, the vacuum adiabatic body may include a conduit 64 passing through the vacuum space 50 to install components connected to the first space and the second space.

FIG. 3 is a view illustrating an example of a support that maintains the vacuum space. An example of the support is as follows. The present disclosure may be any one of the following examples or a combination of two or more examples.

The supports 30, 31, 33, and 35 may be provided to support at least a portion of the plate and a heat transfer resistor to be described later, thereby reducing deformation of at least some of the vacuum space 50, the plate, and the heat transfer resistor to be described later due to external force. The external force may include at least one of a vacuum pressure or external force excluding the vacuum pressure. When the deformation occurs in a direction in which a height of the vacuum space is lower, the support may reduce an increase in at least one of radiant heat conduction, gas heat conduction, surface heat conduction, or support heat conduction, which will be described later. The support may be an object provided to maintain a gap between the first plate and the second plate or an object provided to support the heat transfer resistor. The support may have a degree of deformation resistance greater than that of the plate or be provided to a portion having weak degree of deformation resistance among portions constituting the vacuum adiabatic body, the apparatus having the vacuum adiabatic body, and the wall having the vacuum adiabatic body. According to an embodiment, a degree of deformation resistance represents a degree to which an object resists deformation due to external force applied to the object and is a value determined by a shape including a thickness of the object, a material of the object, a processing method of the object, and the like. Examples of the portions having the weak degree of deformation resistance include the vicinity of the curved portion defined by the plate, at least a portion of the curved portion, the vicinity of an opening defined in the body of the apparatus, which is provided by the plate, or at least a portion of the opening. The support may be disposed to surround at least a portion of the curved portion or the opening or may be provided to correspond to the shape of the curved portion or the opening. However, it is not excluded that the support is provided in other portions. The opening may be understood as a portion of the apparatus including the body and the door capable of opening or closing the opening defined in the body.

An example in which the support is provided to support the plate is as follows. First, at least a portion of the support may be provided in a space defined inside the plate. The plate may include a portion including a plurality of layers, and the support may be provided between the plurality of layers. Optionally, the support may be provided to be connected to at least a portion of the plurality of layers or be provided to support at least a portion of the plurality of layers. Second, at least a portion of the support may be provided to be connected to a surface defined on the outside of the plate. The support may be provided in the vacuum space or an external space of the vacuum space. For example, the plate may include a plurality of layers, and the support may be provided as any one of the plurality of layers. Optionally, the support may be provided to support the other one of the plurality of layers. For example, the plate may include a plurality of portions extending in the longitudinal direction, and the support may be provided as any one of the plurality of portions. Optionally, the support may be provided to support the other one of the plurality of parts. As further another example, the support may be provided in the vacuum space or the external space of the vacuum space as a separate component, which is distinguished from the plate. Optionally, the support may be provided to support at least a portion of a surface defined on the outside of the plate. Optionally, the support may be provided to support one surface of the first plate and one surface of the second plate, and one surface of the first plate and one surface of the second plate may be provided to face each other. Third, the support may be provided to be integrated with the plate. An example in which the support is provided to support the heat transfer resistor may be understood instead of the example in which the support is provided to support the plate. A duplicated description will be omitted.

An example of the support in which heat transfer through the support is designed to be reduced is as follows. First, at least a portion of the components disposed in the vicinity of the support may be provided so as not to be in contact with the support or provided in an empty space provided by the support. Examples of the components include a tube or component connected to the heat transfer resistor to be described later, an exhaust port, a getter port, a tube or component passing through the vacuum space, or a tube or component of which at least a portion is disposed in the vacuum space. Examples of the empty space may include an empty space provided in the support, an empty space provided between the plurality of supports, and an empty space provided between the support and a separate component that is distinguished from the support. Optionally, at least a portion of the component may be disposed in a through-hole defined in the support, be disposed between the plurality of bars, be disposed between the plurality of connection plates, or be disposed between the plurality of support plates. Optionally, at least a portion of the component may be disposed in a spaced space between the plurality bars, be disposed in a spaced space between the plurality of connection plates, or be disposed in a spaced space between the plurality of support plates. Second, the adiabatic body may be provided on at least a portion of the support or in the vicinity of at least a portion of the support. The adiabatic body may be provided to be in contact with the support or provided so as not to be in contact with the support. The adiabatic body may be provided at a portion in which the support and the plate are in contact with each other. The adiabatic body may be provided on at least a portion of one surface and the other surface of the support or be provided to cover at least a portion of one surface and the other surface of the support. The adiabatic body may be provided on at least a portion of a periphery of one surface and a periphery of the other surface of the support or be provided to cover at least a portion of a periphery of one surface and a periphery of the other surface of the support. The support may include a plurality of bars, and the adiabatic body may be disposed on an area from a point at which any one of the plurality of bars is disposed to a midpoint between the one bar and the surrounding bars. Third, when cold is transferred through the support, a heat source may be disposed at a position at which the heat adiabatic body described in the second example is disposed. When a temperature of the first space is lower than a temperature of the second space, the heat source may be disposed on the second plate or in the vicinity of the second plate. When heat is transmitted through the support, a cold source may be disposed at a position at which the heat adiabatic body described in the second example is disposed. When a temperature of the first space is higher than a temperature of the second space, the cold source may be disposed on the second plate or in the vicinity of the second plate. As fourth example, the support may include a portion having heat transfer resistance higher than a metal or a portion having heat transfer resistance higher than the plate. The support may include a portion having heat transfer resistance less than that of another adiabatic body. The support may include at least one of a non-metal material, PPS, and glass fiber (GF), low outgassing PC, PPS, or LCP. This is done for a reason in which high compressive strength, low outgassing, and a water absorption rate, low thermal conductivity, high compressive strength at a high temperature, and excellent workability are being capable of obtained.

Examples of the support may be the bars 30 and 31, the connection plate 35, the support plate 35, a porous material 33, and a filler 33. In this embodiment, the support may include any one of the above examples, or an example in which at least two examples are combined. As first example, the support may include bars 30 and 31. The bar may include a portion extending in a direction in which the first plate and the second plate are connected to each other to support a gap between the first plate and the second plate. The bar may include a portion extending in a height direction of the vacuum space and a portion extending in a direction that is substantially perpendicular to the direction in which the plate extends. The bar may be provided to support only one of the first plate and the second plate or may be provided both the first plate and the second plate. For example, one surface of the bar may be provided to support a portion of the plate, and the other surface of the bar may be provided so as not to be in contact with the other portion of the plate. As another example, one surface of the bar may be provided to support at least a portion of the plate, and the other surface of the bar may be provided to support the other portion of the plate. The support may include a bar having an empty space therein or a plurality of bars, and an empty space are provided between the plurality of bars. In addition, the support may include a bar, and the bar may be disposed to provide an empty space between the bar and a separate component that is distinguished from the bar. The support may selectively include a connection plate 35 including a portion connected to the bar or a portion connecting the plurality of bars to each other. The connection plate may include a portion extending in the longitudinal direction of the vacuum space or a portion extending in the direction in which the plate extends. An XZ-plane cross-sectional area of the connection plate may be greater than an XZ-plane cross-sectional area of the bar. The connection plate may be provided on at least one of one surface and the other surface of the bar or may be provided between one surface and the other surface of the bar. At least one of one surface and the other surface of the bar may be a surface on which the bar supports the plate. The shape of the connection plate is not limited. The support may include a connection plate having an empty space therein or a plurality of connection plates, and an empty space are provided between the plurality of connection plates. In addition, the support may include a connection plate, and the connection plate may be disposed to provide an empty space between the connection plate and a separate component that is distinguished from the connection plate. As a second example, the support may include a support plate 35. The support plate may include a portion extending in the longitudinal direction of the vacuum space or a portion extending in the direction in which the plate extends. The support plate may be provided to support only one of the first plate and the second plate or may be provided both the first plate and the second plate. For example, one surface of the support plate may be provided to support a portion of the plate, and the other surface of the support plate may be provided so as not to be in contact with the other portion of the plate. As another example, one surface of the support plate may be provided to support at least a portion of the plate, and the other surface of the support plate may be provided to support the other portion of the plate. A cross-sectional shape of the support plate is not limited. The support may include a support plate having an empty space therein or a plurality of support plates, and an empty space are provided between the plurality of support plates. In addition, the support may include a support plate, and the support plate may be disposed to provide an empty space between the support plate and a separate component that is distinguished from the support plate. As a third example, the support may include a porous material 33 or a filler 33. The inside of the vacuum space may be supported by the porous material or the filler. The inside of the vacuum space may be completely filled by the porous material or the filler. The support may include a plurality of porous materials or a plurality of fillers, and the plurality of porous materials or the plurality of fillers may be disposed to be in contact with each other. When an empty space is provided inside the porous material, provided between the plurality of porous materials, or provided between the porous material and a separate component that is distinguished from the porous material, the porous material may be understood as including any one of the aforementioned bar, connection plate, and support plate. When an empty space is provided inside the filler, provided between the plurality of fillers, or provided between the filler and a separate component that is distinguished from the filler, the filler may be understood as including any one of the aforementioned bar, connection plate, and support plate. The support according to the present disclosure may include any one of the above examples or an example in which two or more examples are combined.

Referring to FIG. 3a, as an embodiment, the support may include a bar 31 and a connection plate and support plate 35. The connection plate and the supporting plate may be designed separately. Referring to FIG. 3b, as an embodiment, the support may include a bar 31, a connection plate and support plate 35, and a porous material 33 filled in the vacuum space. The porous material 33 may have emissivity greater than that of stainless steel, which is a material of the plate, but since the vacuum space is filled, resistance efficiency of radiant heat transfer is high. The porous material may also function as a heat transfer resistor to be described later. More preferably, the porous material may perform a function of a radiation resistance sheet to be described later. Referring to FIG. 3c, as an embodiment, the support may include a porous material 33 or a filler 33. The porous material 33 and the filler may be provided in a compressed state to maintain a gap between the vacuum space. The film 34 may be provided in a state in which a hole is punched as, for example, a PE material. The porous material 33 or the filler may perform both a function of the heat transfer resistor and a function of the support, which will be described later. More preferably, the porous material may perform both a function of the radiation resistance sheet and a function of the support to be described later.

FIG. 4 is a view for explaining an example of the vacuum adiabatic body based on heat transfer resistors 32, 33, 60, and 63 (e.g., thermal insulator and a heat transfer resistance body). The vacuum adiabatic body according to the present disclosure may optionally include a heat transfer resistor. An example of the heat transfer resistor is as follows. The present disclosure may be any one of the following examples or a combination of two or more examples.

The heat transfer resistors 32, 33, 60, and 63 may be objects that reduce an amount of heat transfer between the first space and the second space or objects that reduce an amount of heat transfer between the first plate and the second plate. The heat transfer resistor may be disposed on a heat transfer path defined between the first space and the second space or be disposed on a heat transfer path formed between the first plate and the second plate. The heat transfer resistor may include a portion extending in a direction along a wall defining the vacuum space or a portion extending in a direction in which the plate extends. Optionally, the heat transfer resistor may include a portion extending from the plate in a direction away from the vacuum space. The heat transfer resistor may be provided on at least a portion of the periphery of the first plate or the periphery of the second plate or be provided on at least a portion of an edge of the first plate or an edge of the second plate. The heat transfer resistor may be provided at a portion, in which the through-hole is defined, or provided as a tube connected to the through-hole. A separate tube or a separate component that is distinguished from the tube may be disposed inside the tube. The heat transfer resistor may include a portion having heat transfer resistance greater than that of the plate. In this case, adiabatic performance of the vacuum adiabatic body may be further improved. A shield 62 may be provided on the outside of the heat transfer resistor to be insulated. The inside of the heat transfer resistor may be insulated by the vacuum space. The shield may be provided as a porous material or a filler that is in contact with the inside of the heat transfer resistor. The shield may be an adiabatic structure that is exemplified by a separate gasket placed outside the inside of the heat transfer resistor. The heat transfer resistor may be a wall defining the third space.

An example in which the heat transfer resistor is connected to the plate may be understood as replacing the support with the heat transfer resistor in an example in which the support is provided to support the plate. A duplicate description will be omitted. The example in which the heat transfer resistor is connected to the support may be understood as replacing the plate with the support in the example in which the heat transfer resistor is connected to the plate. A duplicate description will be omitted. The example of reducing heat transfer via the heat transfer body may be applied as a substitute the example of reducing the heat transfer via the support, and thus, the same explanation will be omitted.

In the present disclosure, the heat transfer resistor may be one of a radiation resistance sheet 32, a porous material 33, a filler 33, and a conductive resistance sheet. In the present disclosure, the heat transfer resistor may include a combination of at least two of the radiation resistance sheet 32, the porous material 33, the filler 33, and the conductive resistance sheet. As a first example, the heat transfer resistor may include a radiation resistance sheet 32. The radiation resistance sheet may include a portion having heat transfer resistance greater than that of the plate, and the heat transfer resistance may be a degree of resistance to heat transfer by radiation. The support may perform a function of the radiation resistance sheet together. A conductive resistance sheet to be described later may perform the function of the radiation resistance sheet together. As a second example, the heat transfer resistor may include conduction resistance sheets 60 and 63. The conductive resistance sheet may include a portion having heat transfer resistance greater than that of the plate, and the heat transfer resistance may be a degree of resistance to heat transfer by conduction. For example, the conductive resistance sheet may have a thickness less than that of at least a portion of the plate. As another example, the conductive resistance sheet may include one end and the other end, and a length of the conductive resistance sheet may be longer than a straight distance connecting one end of the conductive resistance sheet to the other end of the conductive resistance sheet. As another example, the conductive resistance sheet may include a material having resistance to heat transfer greater than that of the plate by conduction. As another example, the heat transfer resistor may include a portion having a curvature radius less than that of the plate.

Referring to FIG. 4a, for example, a conductive resistance sheet may be provided on a side plate connecting the first plate to the second plate. Referring to FIG. 4b, for example, a conductive resistance sheet 60 may be provided on at least a portion of the first plate and the second plate. A connection frame 70 may be further provided outside the conductive resistance sheet. The connection frame may be a portion from which the first plate or the second plate extends or a portion from which the side plate extends. Optionally, the connection frame 70 may include a portion at which a component for sealing the door and the body and a component disposed outside the vacuum space such as the exhaust port and the getter port, which are required for the exhaust process, are connected to each other. Referring to FIG. 4c, for example, a conductive resistance sheet may be provided on a side plate connecting the first plate to the second plate. The conductive resistance sheet may be installed in a through-hole passing through the vacuum space. The conduit 64 may be provided separately outside the conductive resistance sheet. The conductive resistance sheet may be provided in a pleated shape. Through this, the heat transfer path may be lengthened, and deformation due to a pressure difference may be prevented. A separate shielding member for insulating the conductive resistance sheet 63 may also be provided. The conductive resistance sheet may include a portion having a degree of deformation resistance less than that of at least one of the plate, the radiation resistance sheet, or the support. The radiation resistance sheet may include a portion having a degree of deformation resistance less than that of at least one of the plate or the support. The plate may include a portion having a degree of deformation resistance less than that of the support. The conductive resistance sheet may include a portion having conductive heat transfer resistance greater than that of at least one of the plate, the radiation resistance sheet, or the support. The radiation resistance sheet may include a portion having radiation heat transfer resistance greater than that of at least one of the plate, the conductive resistance sheet, or the support. The support may include a portion having heat transfer resistance greater than that of the plate. For example, at least one of the plate, the conductive resistance sheet, or the connection frame may include stainless steel material, the radiation resistance sheet may include aluminum, and the support may include a resin material.

FIG. 5 is a graph for observing a process of exhausting the inside of the vacuum adiabatic body with a time and pressure when the support is used. An example of a vacuum adiabatic body vacuum exhaust process vacuum is as follows. The present disclosure may be any one of the following examples or a combination of two or more examples.

While the exhaust process is being performed, an outgassing process, which is a process in which a gas of the vacuum space is discharged, or a potential gas remaining in the components of the vacuum adiabatic body is discharged, may be performed. As an example of the outgassing process, the exhaust process may include at least one of heating or drying the vacuum adiabatic body, providing a vacuum pressure to the vacuum adiabatic body, or providing a getter to the vacuum adiabatic body. In this case, it is possible to promote the vaporization and exhaust of the potential gas remaining in the component provided in the vacuum space. The exhaust process may include a process of cooling the vacuum adiabatic body. The cooling process may be performed after the process of heating or drying the vacuum adiabatic body is performed. The process of heating or drying the vacuum adiabatic body process of providing the vacuum pressure to the vacuum adiabatic body may be performed together. The process of heating or drying the vacuum adiabatic body and the process of providing the getter to the vacuum adiabatic body may be performed together. After the process of heating or drying the vacuum adiabatic body is performed, the process of cooling the vacuum adiabatic body may be performed. The process of providing the vacuum pressure to the vacuum adiabatic body and the process of providing the getter to the vacuum adiabatic body may be performed so as not to overlap each other. For example, after the process of providing the vacuum pressure to the vacuum adiabatic body is performed, the process of providing the getter to the vacuum adiabatic body may be performed. When the vacuum pressure is provided to the vacuum adiabatic body, a pressure of the vacuum space may drop to a certain level and then no longer drop. Here, after stopping the process of providing the vacuum pressure to the vacuum adiabatic body, the getter may be input. As an example of stopping the process of providing the vacuum pressure to the vacuum adiabatic body, an operation of a vacuum pump connected to the vacuum space may be stopped. When inputting the getter, the process of heating or drying the vacuum adiabatic body may be performed together. Through this, the outgas sing may be promoted. As another example, after the process of providing the getter to the vacuum adiabatic body is performed, the process of providing the vacuum pressure to the vacuum adiabatic body may be performed.

The time during which the vacuum adiabatic body vacuum exhaust process is performed may be referred to as a vacuum exhaust time. The vacuum exhaust time includes at least one of a time $\Delta t1$ during which the process of heating or drying the vacuum adiabatic body is performed, a time $\Delta t2$ during which the process of maintaining the getter in the vacuum adiabatic body is performed, of a time $\Delta t3$ during which the process of cooling the vacuum adiabatic body is performed. Examples of times $\Delta t1$, $\Delta t2$, and $\Delta t3$ are as follows. The present disclosure may be any one of the following examples or a combination of two or more examples. In the vacuum adiabatic body vacuum exhaust process, the time $\Delta t1$ may be a time $t1a$ or more and a time $t1b$ or less. As a first example, the time $t1a$ may be greater than or equal to about 0.2 hr and less than or equal to about 0.5 hr. The time $t1b$ may be greater than or equal to about 1 hr and less than or equal to about 24.0 hr. The time $\Delta t1$ may be about 0.3 hr or more and about 12.0 hr or less. The time $\Delta t1$ may be about 0.4 hr or more and about 8.0 hr or less. The time $\Delta t1$ may be about 0.5 hr or more and about 4.0 hr or less. In this case, even if the $\Delta t1$ is kept as short as possible, the sufficient outgassing may be applied to the vacuum adiabatic body. For example, this case may include a case in which a component of the vacuum adiabatic body, which is exposed to the vacuum space, among the components of the vacuum adiabatic body, has an outgassing rate (%) less than that of any one of the component of the vacuum adiabatic body, which is exposed to the external space of the vacuum space. Specifically, the component exposed to the vacuum space may include a portion having a outgassing rate less than that of a thermoplastic polymer. More specifically, the support or the radiation resistance sheet may be disposed in the vacuum space, and the outgassing rate of the support may be less than that of the thermoplastic plastic. As another example, this case may include a case in which a component of the vacuum adiabatic body, which is exposed to the vacuum space, among the components of the vacuum adiabatic body, has a max operating temperature (° C.) greater than that of any one of the component of the vacuum adiabatic body, which is exposed to the external space of the vacuum space. In this case, the vacuum adiabatic body may be heated to a higher temperature to increase in outgassing rate. For example, the component exposed to the vacuum space may include a portion having an operating temperature greater than that of the thermoplastic polymer. As a more specific example, the support or the radiation resistance sheet may be disposed in the vacuum space, and a use temperature of the support may be higher than that of the thermoplastic plastic. As another example, among the components of the vacuum adiabatic body, the component exposed to the vacuum space may contain more metallic portion than a non-metallic portion. That is, a mass of the metallic portion may be greater than a mass of the non-metallic portion, a volume of the metallic portion may be greater than a volume of the non-metallic portion, or an area of the metallic portion exposed to the vacuum space may be greater than an area exposed to the non-metallic portion of the vacuum space. When the components exposed to the vacuum space are provided in plurality, the sum of the volume of the metal material included in the first component and the volume of the metal material included in the second component may be greater than that of the volume of the non-metal material included in the first component and the volume of the non-metal material included in the second component. When the components exposed to the vacuum space are provided in plurality, the sum of the mass of the metal material included in the first component and the mass of the metal material included in the second component may be greater than that of the mass of the non-metal material included in the first component and the mass of the non-metal material included in the second component. When the components exposed to the vacuum space are provided in plurality, the sum of the area of the metal material, which is exposed to the vacuum space and included in the first component, and an area of the metal material, which is exposed to the vacuum space and included in the second component, may be greater than that of the area of the non-metal material, which is exposed to the vacuum space and included in the first component, and an area of the non-metal material, which is exposed to the vacuum space and included in the second component. As a second example, the time t1$a$ may be greater than or equal to about 0.5 hr and less than or equal to about 1 hr. The time t1$b$ may be greater than or equal to about 24.0 hr and less than or equal to about 65 hr. The time $\Delta$t1 may be about 1.0 hr or more and about 48.0 hr or less. The time $\Delta$t1 may be about 2 hr or more and about 24.0 hr or less. The time $\Delta$t1 may be about 3 hr or more and about 12.0 hr or less. In this case, it may be the vacuum adiabatic body that needs to maintain the $\Delta$t1 as long as possible. In this case, a case opposite to the examples described in the first example or a case in which the component exposed to the vacuum space is made of a thermoplastic material may be an example. A duplicated description will be omitted. In the vacuum adiabatic body vacuum exhaust process, the time $\Delta$t1 may be a time t1$a$ or more and a time t1$b$ or less. The time t2$a$ may be greater than or equal to about 0.1 hr and less than or equal to about 0.3 hr. The time t2$b$ may be greater than or equal to about 1 hr and less than or equal to about 5.0 hr. The time $\Delta$t2 may be about 0.2 hr or more and about 3.0 hr or less. The time $\Delta$t2 may be about 0.3 hr or more and about 2.0 hr or less. The time $\Delta$t2 may be about 0.5 hr or more and about 1.5 hr or less. In this case, even if the time $\Delta$t2 is kept as short as possible, the sufficient outgassing through the getter may be applied to the vacuum adiabatic body. In the vacuum adiabatic body vacuum exhaust process, the time $\Delta$t3 may be a time t3$a$ or more and a time t3$b$ or less. The time t2$a$ may be greater than or equal to about 0.2 hr and less than or equal to about 0.8 hr. The time t2$b$ may be greater than or equal to about 1 hr and less than or equal to about 65.0 hr. The tine $\Delta$t3 may be about 0.2 hr or more and about 48.0 hr or less. The time $\Delta$t3 may be about 0.3 hr or more and about 24.0 hr or less. The time $\Delta$t3 may be about 0.4 hr or more and about 12.0 hr or less. The time $\Delta$t3 may be about 0.5 hr or more and about 5.0 hr or less. After the heating or drying process is performed during the exhaust process, the cooling process may be performed. For example, when the heating or drying process is performed for a long time, the time $\Delta$t3 may be long. The vacuum adiabatic body according to the present disclosure may be manufactured so that the time $\Delta$t1 is greater than the time $\Delta$t2, the time $\Delta$t1 is less than or equal to the time $\Delta$t3, or the time $\Delta$t3 is greater than the time $\Delta$t2. The following relational expression is satisfied: $\Delta t2 < \Delta t1 \leq \Delta t3$. The vacuum adiabatic body according to an embodiment may be manufactured so that the relational expression: $\Delta t1+\Delta t2+\Delta t3$ may be greater than or equal to about 0.3 hr and less than or equal to about 70 hr, be greater than or equal to about 1 hr and less than or equal to about 65 hr, or be greater than or equal to about 2 hr and less than or equal to about 24 hr. The relational expression: $\Delta t1+\Delta t2+\Delta t3$ may be manufactured to be greater than or equal to about 3 hr and less than or equal to about 6 hr.

An example of the vacuum pressure condition during the exhaust process is as follows. The present disclosure may be any one of the following examples or a combination of two or more examples. A minimum value of the vacuum pressure in the vacuum space during the exhaust process may be greater than about 1.8E-6 Torr. The minimum value of the vacuum pressure may be greater than about 1.8E-6 Torr and less than or equal to about 1.0E-4 Torr, be greater than about 0.5E-6 Torr and less than or equal to about 1.0E-4 Torr, or be greater than about 0.5E-6 Torr and less than or equal to about 0.5E-5 Torr. The minimum value of the vacuum pressure may be greater than about 0.5E-6 Torr and less than about 1.0E-5 Torr. As such, the limitation in which the minimum value of the vacuum pressure provided during the exhaust process is because, even if the pressure is reduced through the vacuum pump during the exhaust process, the decrease in vacuum pressure is slowed below a certain level. As an embodiment, after the exhaust process is performed, the vacuum pressure of the vacuum space may be maintained at a pressure greater than or equal to about 1.0E-5 Torr and less than or equal to about 5.0E-1 Torr. The maintained vacuum pressure may be greater than or equal to about 1.0E-5 Torr and less than or equal to about 1.0E-1 Torr, be greater than or equal to about 1.0E-5 Torr and less than or equal to about 1.0E-2 Torr, be greater than or equal to about 1.0E-4 Torr and less than or equal to about 1.0E-2 Torr, or be greater than or equal to about 1.0E-5 Torr and less than or equal to about 1.0E-3 Torr. As a result of predicting the change in vacuum pressure with an accelerated experiment of two example products, one product may be provided so that the vacuum pressure is maintained below about 1.0E-04 Torr even after about 16.3 years, and the other product may be provided so that the vacuum pressure is maintained below about 1.0E-04 Torr even after about 17.8 years. As described above, the vacuum pressure of the vacuum adiabatic body may be used industrially only when it is maintained below a predetermined level even if there is a change over time.

FIG. 5$a$ is a graph of an elapsing time and pressure in the exhaust process according to an example, and FIG. 5$b$ is a view explaining results of a vacuum maintenance test in the acceleration experiment of the vacuum adiabatic body of the refrigerator having an internal volume of about 128 liters. Referring to FIG. 5$b$, it is seen that the vacuum pressure gradually increases according to the aging. For example, it is confirmed that the vacuum pressure is about 6.7E-04 Torr after about 4.7 years, about 1.7E-03 Torr after about 10 years, and about 1.0E-02 Torr after about 59 years. According to these experimental results, it is confirmed that the vacuum adiabatic body according to the embodiment is sufficiently industrially applicable.

FIG. 6 is a graph illustrating results obtained by comparing the vacuum pressure with gas conductivity. Referring to FIG. 6, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three values of about 3 mm, about 4.5 mm, and about 9 mm. The gap in the vacuum space 50 is defined as follows. When the radiation resistance sheet 32 exists inside surface vacuum space 50, the gap is a distance between the radiation resistance sheet 32 and the plate adjacent thereto. When the radiation resistance sheet 32 does not exist inside surface vacuum space 50, the gap is a distance between the first and second plates. It was seen that, since the size of the gap is small at a point corresponding to a typical effective heat transfer coefficient of about 0.0196 W/mK, which is provided to an adiabatic material formed by foaming polyurethane, the vacuum pressure is about 5.0E-1 Torr even when the size of the gap is about 3 mm. Meanwhile, it was seen that the point at which reduction in adiabatic effect caused by the gas conduction heat is saturated even though the vacuum pressure decreases is a point at which the vacuum pressure is approximately 4.5E-3 Torr. The vacuum pressure of about 4.5E-3 Torr may be defined as the point at which the reduction in adiabatic effect caused by the gas conduction heat is saturated. Also, when the effective heat transfer coefficient is about 0.01 W/mK, the vacuum pressure is about 1.2E-2 Torr. An example of a range of the vacuum pressure in the vacuum space according to the gap is presented. The support may include at least one of a bar, a connection plate, or a support plate. In this case, when the gap of the vacuum space is greater than or equal to about 3 mm, the vacuum pressure may be greater than or equal to A and less than about 5E-1 Torr, or be greater than about 2.65E-1 Torr and less than about 5E-1 Torr. As another example, the support may include at least one of a bar, a connection plate, or a support plate. In this case, when the gap of the vacuum space is greater than or equal to about 4.5 mm, the vacuum pressure may be greater than or equal to A and less than about 3E-1 Torr, or be greater than about 1.2E-2 Torr and less than about 5E-1 Torr. As another example, the support may include at least one of a bar, a connection plate, or a support plate, and when the gap of the vacuum space is greater than or equal to about 9 mm, the vacuum pressure may be greater than or equal to A and less than about $1.0 \times 10^{-1}$ Torr or be greater than about 4.5E-3 Torr and less than about 5E-1 Torr. Here, the A may be greater than or equal to about $1.0 \times 10^{-6}$ Torr and less than or equal to about 1.0E-5 Torr. The A may be greater than or equal to about $1.0 \times 10^{-5}$ Torr and less than or equal to about 1.0E-4 Torr. When the support includes a porous material or a filler, the vacuum pressure may be greater than or equal to about 4.7E-2 Torr and less than or equal to about 5E-1 Torr. In this case, it is understood that the size of the gap ranges from several micrometers to several hundreds of micrometers. When the support and the porous material are provided together in the vacuum space, a vacuum pressure may be created and used, which is middle between the vacuum pressure when only the support is used and the vacuum pressure when only the porous material is used.

FIG. 7 is a view illustrating various examples of the vacuum space. The present disclosure may be any one of the following examples or a combination of two or more examples.

Referring to FIG. 7, the vacuum adiabatic body according to the present disclosure may include a vacuum space. The vacuum space 50 may include a first vacuum space extending in a first direction (e.g., X-axis) and having a predetermined height. The vacuum space 50 may optionally include a second vacuum space (hereinafter, referred to as a vacuum space expansion portion) different from the first vacuum space in at least one of the height or the direction. The vacuum space expansion portion may be provided by allowing at least one of the first and second plates or the side plate to extend. In this case, the heat transfer resistance may increase by lengthening a heat conduction path along the plate. The vacuum space expansion portion in which the second plate extends may reinforce adiabatic performance of a front portion of the vacuum adiabatic body. The vacuum space expansion portion in which the second plate extends may reinforce adiabatic performance of a rear portion of the vacuum adiabatic body, and the vacuum space expansion portion in which the side plate extends may reinforce adiabatic performance of a side portion of the vacuum adiabatic body. Referring to FIG. 7a, the second plate may extend to provide the vacuum space expansion portion 51. The second plate may include a second portion 202 extending from a first portion 201 defining the vacuum space 50 and the vacuum space expansion portion 51. The second portion 202 of the second plate may branch a heat conduction path along the second plate to increase in heat transfer resistance. Referring to FIG. 7b, the side plate may extend to provide the vacuum space expansion portion. The side plate may include a second portion 152 extending from a first portion 151 defining the vacuum space 50 and the vacuum space extension portion 51. The second portion of the side plate may branch the heat conduction path along the side plate to improve the adiabatic performance. The first and second portions 151 and 152 of the side plate may branch the heat conduction path to increase in heat transfer resistance. Referring to FIG. 7c, the first plate may extend to provide the vacuum space expansion portion. The first plate may include a second portion 102 extending from the first portion 101 defining the vacuum space 50 and the vacuum space expansion portion 51. The second portion of the first plate may branch the heat conduction path along the second plate to increase in heat transfer resistance. Referring to FIG. 7d, the vacuum space expansion portion 51 may include an X-direction expansion portion 51a and a Y-direction expansion portion 51b of the vacuum space. The vacuum space expansion portion 51 may extend in a plurality of directions of the vacuum space 50. Thus, the adiabatic performance may be reinforced in multiple directions and may increase by lengthening the heat conduction path in the plurality of directions to improve the heat transfer resistance. The vacuum space expansion portion extending in the plurality of directions may further improve the adiabatic performance by branching the heat conduction path. Referring to FIG. 7e, the side plate may provide the vacuum space extension portion extending in the plurality of directions. The vacuum space expansion portion may reinforce the adiabatic performance of the side portion of the vacuum adiabatic body. Referring to FIG. 7f, the first plate may provide the vacuum space extension portion extending in the plurality of directions. The vacuum space expansion portion may reinforce the adiabatic performance of the side portion of the vacuum adiabatic body.

FIG. 8 is a view for explaining another adiabatic body. The present disclosure may be any one of the following examples or a combination of two or more examples. Referring to FIG. 8, the vacuum adiabatic body according to the present disclosure may optionally include another adiabatic body 90. Another adiabatic body may have a degree of vacuum less than that of the vacuum adiabatic body and be an object that does not include a portion having a vacuum state therein. The vacuum adiabatic body and another vacuum adiabatic body may be directly connected to each other or connected to each other through an intermedium. In this case, the intermedium may have a degree of vacuum less than that of at least one of the vacuum adiabatic body or another adiabatic body or may be an object that does not include a portion having the vacuum state therein. When the vacuum adiabatic body includes a portion in which the height of the vacuum adiabatic body is high and a portion in which the height of the vacuum adiabatic body is low, another adiabatic body may be disposed at a portion having the low height of the vacuum adiabatic body. Another adiabatic body may include a portion connected to at least a portion of the first and second plates and the side plate. Another adiabatic body may be supported on the plate or coupled or sealed. A degree of sealing between another adiabatic body and the plate may be lower than a degree of sealing between the plates. Another adiabatic body may include a cured adiabatic body (e.g., PU foaming solution) that is cured after being injected, a premolded resin, a peripheral adiabatic body, and a side panel. At least a portion of the plate may be provided to be disposed inside another adiabatic body. Another adiabatic body may include an empty space. The plate may be provided to be accommodated in the empty space. At least a portion of the plate may be provided to cover at least a portion of another adiabatic body. Another adiabatic body may include a member covering an outer surface thereof. The member may be at least a portion of the plate. Another adiabatic body may be an intermedium for connecting, supporting, bonding, or sealing the vacuum adiabatic body to the component. Another adiabatic body may be an intermedium for connecting, supporting, bonding, or sealing the vacuum adiabatic body to another vacuum adiabatic body. Another adiabatic body may include a portion connected to a component coupling portion provided on at least a portion of the plate. Another adiabatic body may include a portion connected to a cover covering another adiabatic body. The cover may be disposed between the first plate and the first space, between the second plate and the second space, or between the side plate and a space other than the vacuum space 50. For example, the cover may include a portion on which the component is mounted. As another example, the cover may include a portion that defines an outer appearance of another adiabatic body. Referring to FIGS. 8a to 8f, another adiabatic body may include a peripheral adiabatic body. The peripheral adiabatic body may be disposed on at least a portion of a periphery of the vacuum adiabatic body, a periphery of the first plate, a periphery of the second plate, and the side plate. The peripheral adiabatic body disposed on the periphery of the first plate or the periphery of the second plate may extend to a portion at which the side plate is disposed or may extend to the outside of the side plate. The peripheral adiabatic body disposed on the side plate may extend to a portion at which the first plate or may extend to the outside of the first plate or the second plate. Referring to FIGS. 8g to 8h, another adiabatic body may include a central adiabatic body. The central adiabatic body may be disposed on at least a portion of a central portion of the vacuum adiabatic body, a central portion of the first plate, or a central portion of the second plate.

Referring to FIG. 8a, the peripheral adiabatic body 92 may be placed on the periphery of the first plate. The peripheral adiabatic body may be in contact with the first plate. The peripheral adiabatic body may be separated from the first plate or further extend from the first plate (indicated by dotted lines). The peripheral adiabatic body may improve the adiabatic performance of the periphery of the first plate. Referring to FIG. 8b, the peripheral adiabatic body may be placed on the periphery of the second plate. The peripheral adiabatic body may be in contact with the second plate. The peripheral adiabatic body may be separated from the second plate or further extend from the second plate (indicated by dotted lines). The periphery adiabatic body may improve the adiabatic performance of the periphery of the second plate. Referring to FIG. 8c, the peripheral adiabatic body may be disposed on the periphery of the side plate. The peripheral adiabatic body may be in contact with the side plate. The peripheral adiabatic body may be separated from the side plate or further extend from the side plate. The peripheral adiabatic body may improve the adiabatic performance of the periphery of the side plate Referring to FIG. 8d, the peripheral adiabatic body 92 may be disposed on the periphery of the first plate. The peripheral adiabatic body may be placed on the periphery of the first plate constituting the vacuum space expansion portion 51. The peripheral adiabatic body may be in contact with the first plate constituting the vacuum space extension portion. The peripheral adiabatic body may be separated from or further extend to the first plate constituting the vacuum space extension portion. The peripheral adiabatic body may improve the adiabatic performance of the periphery of the first plate constituting the vacuum space expansion portion. Referring to FIGS. 8e and 8f, in the peripheral adiabatic body, the vacuum space extension portion may be disposed on a periphery of the second plate or the side plate. The same explanation as in FIG. 8d may be applied. Referring to FIG. 8g, the central adiabatic body 91 may be placed on a central portion of the first plate. The central adiabatic body may improve adiabatic performance of the central portion of the first plate. Referring to FIG. 8h, the central adiabatic body may be disposed on the central portion of the second plate. The central adiabatic body may improve adiabatic performance of the central portion of the second plate.

FIG. 9 is a view for explaining a heat transfer path between first and second plates having different temperatures. An example of the heat transfer path is as follows. The present disclosure may be any one of the following examples or a combination of two or more examples.

The heat transfer path may pass through the extension portion at at least a portion of the first portion 101 of the first plate, the first portion 201 of the second plate, or the first portion 151 of the side plate. The first portion may include a portion defining the vacuum space. The extension portions 102, 152, and 202 may include portions extending in a direction away from the first portion. The extension portion may include a side portion of the vacuum adiabatic body, a side portion of the plate having a higher temperature among the first and second plates, or a portion extending toward the side portion of the vacuum space 50. The extension portion may include a front portion of the vacuum adiabatic body, a front portion of the plate having a higher temperature among the first and second plates, or a front portion extending in a direction away from the front portion of the vacuum space 50. Through this, it is possible to reduce generation of dew on the front portion. The vacuum adiabatic body or the vacuum space 50 may include first and second surfaces having different temperatures from each other. The temperature of the first surface may be lower than that of the second surface. For example, the first surface may be the first plate, and the second surface may be the second plate. The extension portion may extend in a direction away from the second surface or include a portion extending toward the first surface. The extension portion may include a portion, which is in contact with the second surface, or a portion extending in a state of being in contact with the second surface. The extension portion may include a portion extending to be spaced apart from the two surfaces. The extension portion may include a portion having heat transfer resistance greater than that of at least a portion of the plate or the first surface. The extension portion may include a plurality of portions extending in different directions. For example, the extension portion may include a second portion 202 of the second plate and a third portion 203 of the second plate. The third portion may also be provided on the first plate or the side plate. Through this, it is possible to increase in heat transfer resistance by lengthening the heat transfer path. In the extension portion, the above-described heat transfer resistor may be disposed. Another adiabatic body may be disposed outside the extending portion. Through this, the extension portion may reduce generation of dew on the second surface. Referring to FIG. 9*a*, the second plate may include the extension portion extending to the periphery of the second plate. Here, the extension portion may further include a portion extending backward. Referring to FIG. 9*b*, the side plate may include the extension portion extending to a periphery of the side plate. Here, the extension portion may be provided to have a length that is less than or equal to that of the extension portion of the second plate. Here, the extension portion may further include a portion extending backward. Referring to FIG. 9*c*, the first plate may include the extension portion extending to the periphery of the first plate. Here, the extension portion may extend to a length that is less than or equal to that of the extension portion of the second plate. Here, the extension portion may further include a portion extending backward.

FIG. 10 is a view for explaining a branch portion on the heat transfer path between first and second plates having different temperatures. An example of the branch portion is as follows. The present disclosure may be any one of the following examples or a combination of two or more examples.

Optionally, the heat transfer path may pass through portions 205, 153, and 104, each of which is branched from at least a portion of the first plate, the second plate, or the side plate. Here, the branched heat transfer path means a heat transfer path through which heat flows to be separated in a different direction from the heat transfer path through which heat flows along the plate. The branched portion may be disposed in a direction away from the vacuum space 50. The branched portion may be disposed in a direction toward the inside of the vacuum space 50. The branched portion may perform the same function as the extension portion described with reference to FIG. 9, and thus, a description of the same portion will be omitted. Referring to FIG. 10*a*, the second plate may include the branched portion 205. The branched portion may be provided in plurality, which are spaced apart from each other. The branched portion may include a third portion 203 of the second plate. Referring to FIG. 10*b*, the side plate may include the branched portion 153. The branched portion 153 may be branched from the second portion 152 of the side plate. The branched portion 153 may provide at least two. At least two branched portions 153 spaced apart from each other may be provided on the second portion 152 of the side plate. Referring to FIG. 10*c*, the first plate may include the branched portion 104. The branched portion may further extend from the second portion 102 of the first plate. The branched portion may extend toward the periphery. The branched portion 104 may be bent to further extend. A direction in which the branched portion extends in FIGS. 10*a*, 10*b*, and 10*c* may be the same as at least one of the extension directions of the extension portion described in FIG. 10.

FIG. 11 is a view for explaining a process of manufacturing the vacuum adiabatic body.

Optionally, the vacuum adiabatic body may be manufactured by a vacuum adiabatic body component preparation process in which the first plate and the second plate are prepared in advance. Optionally, the vacuum adiabatic body may be manufactured by a vacuum adiabatic body component assembly process in which the first plate and the second plate are assembled. Optionally, the vacuum adiabatic body may be manufactured by a vacuum adiabatic body vacuum exhaust process in which a gas in the space defined between the first plate and the second plate is discharged. Optionally, after the vacuum adiabatic body component preparation process is performed, the vacuum adiabatic body component assembly process or the vacuum adiabatic body exhaust process may be performed. Optionally, after the vacuum adiabatic body component assembly process is performed, the vacuum adiabatic body vacuum exhaust process may be performed. Optionally, the vacuum adiabatic body may be manufactured by the vacuum adiabatic body component sealing process (S3) in which the space between the first plate and the second plate is sealed. The vacuum adiabatic body component sealing process may be performed before the vacuum adiabatic body vacuum exhaust process (S4). The vacuum adiabatic body may be manufactured as an object with a specific purpose by an apparatus assembly process (S5) in which the vacuum adiabatic body is combined with the components constituting the apparatus. The apparatus assembly process may be performed after the vacuum adiabatic body vacuum exhaust process. Here, the components constituting the apparatus means components constituting the apparatus together with the vacuum adiabatic body.

The vacuum adiabatic body component preparation process (S1) is a process in which components constituting the vacuum adiabatic body are prepared or manufactured. Examples of the components constituting the vacuum adiabatic body may include various components such as a plate, a support, a heat transfer resistor, and a tube. The vacuum adiabatic body component assembly process (S2) is a process in which the prepared components are assembled. The vacuum adiabatic body component assembly process may include a process of disposing at least a portion of the support and the heat transfer resistor on at least a portion of the plate. For example, the vacuum adiabatic body component assembly process may include a process of disposing at least a portion of the support and the heat transfer resistor between the first plate and the second plate. Optionally, the vacuum adiabatic body component assembly process may include a process of disposing a penetration component on at least a portion of the plate. For example, the vacuum adiabatic body component assembly process may include a process of disposing the penetration component or a surface component between the first and second plates. After the penetration component may be disposed between the first plate and the second plate, the penetration component may be connected or sealed to the penetration component coupling portion.

An example of a vacuum adiabatic body vacuum exhaust process vacuum is as follows. The present disclosure may be any one of the, examples or a combination of two or more examples. The vacuum adiabatic body vacuum exhaust process may include at least one of a process of inputting the vacuum adiabatic body into an exhaust passage, a getter activation process, a process of checking vacuum leakage and a process of closing the exhaust port. The process of forming the coupling part may be performed in at least one of the vacuum adiabatic body component preparation process, the vacuum adiabatic body component assembly process, or the apparatus assembly process. Before the vacuum adiabatic body exhaust process is performed, a process of washing the components constituting the vacuum adiabatic body may be performed. Optionally, the washing process may include a process of applying ultrasonic waves to the components constituting the vacuum adiabatic body or a process of providing ethanol or a material containing ethanol to surfaces of the components constituting the vacuum adiabatic body. The ultrasonic wave may have an intensity between about 10 kHz and about 50 kHz. A content of ethanol in the material may be about 50% or more. For example, the content of ethanol in the material may range of about 50% to about 90%. As another example, the content of ethanol in the material may range of about 60% to about 80%. As another example, the content of ethanol in the material may be range of about 65% to about 75%. Optionally, after the washing process is performed, a process of drying the components constituting the vacuum adiabatic body may be performed. Optionally, after the washing process is performed, a process of heating the components constituting the vacuum adiabatic body may be performed.

The contents described in FIGS. 1 to 11 may be applied to all or selectively applied to the embodiments described with reference to the drawings below.

As an embodiment, an example of a process associated with the support is as follows. The present disclosure may be any one of the following examples or a combination of two or more examples. The vacuum adiabatic body component preparation process may include a process of manufacturing the support. Before the vacuum adiabatic body vacuum exhaust process is performed, the process of manufacturing the support may be performed. For example, the support may be manufactured through the injection. Optionally, before the vacuum adiabatic body vacuum exhaust process is performed, the process of washing the support may be performed. Before the vacuum adiabatic body vacuum exhaust process is performed or while the vacuum adiabatic body vacuum exhaust process is performed, a process of storing the support under a predetermined condition may be performed. For example, before the vacuum adiabatic body vacuum exhaust process is performed, a primary storage process may be performed, and while the vacuum adiabatic body vacuum exhaust process is performed, a secondary storage process may be performed. For another example, during the vacuum adiabatic body vacuum exhaust process is performed, the storage process may be performed. Examples of the storage process are as follows. As a first example, the storage process may include a process of drying or heating the support. Thus, the outgas sing form the support may be performed. The heating temperature may be greater than a predetermined reference temperature and less than a melting point of the support. The predetermined reference temperature may be a temperature between about 10 degrees and about 40 degrees. The heating temperature may be greater than about 80 degrees and less than about 280 degrees. The heating temperature may be greater than about 100 degrees and less than about 260 degrees. The heating temperature may be greater than about 120 degrees and less than about 240 degrees. The heating temperature may be greater than about 140 degrees and less than about 220 degrees. The heating temperature may be greater than about 160 degrees and less than about 200 degrees. The heating temperature may be greater than about 170 degrees and less than about 190 degrees. The heating temperature in the primary storage process may be less than the heating temperature in the secondary storage process. Optionally, the storage process may include a process of cooling the support. After the process of drying or heating the support is performed, the process of cooling the support may be performed. As a second example, the storage process may include a process of storing the support in a state of a temperature less than atmospheric pressure. Thus, the outgassing form the support may be performed. The storage pressure may be less than a pressure in a vacuum state in which the internal space between the first plate and the second plate is maintained. The storage pressure may be greater than 10E-10 torr and less than atmospheric pressure. The storage pressure may be greater than 10E-9 torr and less than atmospheric pressure. The storage pressure may be greater than 10E-8 torr and less than atmospheric pressure. The storage pressure may be greater than 10E-7 torr and less than atmospheric pressure. The storage pressure may be in a state of being greater than 10E-3 torr and less than atmospheric pressure. The storage pressure may be in a state of being greater than 10E-2 torr and less than atmospheric pressure. The storage pressure may be in a state of being greater than 0.5E-1 torr and less than atmospheric pressure. The storage pressure may be in a state of being greater than 0.5E-1 torr and less than 3E-1 torr. The storage pressure in the primary storage process may be higher than the storage pressure in the secondary storage process. Optionally, the storage process may include a storage process at the atmospheric pressure. After the process of storing the support in a state of the pressure less than the atmospheric pressure is performed, the process of storing the support in the state of the atmospheric pressure may be performed.

Optionally, before the vacuum adiabatic body vacuum exhaust process is performed, a process of coupling a plurality of portions of the support to each other may be performed. For example, the coupling process may include a process of coupling a bar of the support to a connection plate. As another example, the coupling process may include a process of coupling the bar of the support to the support plate.

The process associated with the support may optionally include a process related to the process of storing the support under the predetermined condition. An example of a process sequence related to the process in which the support is stored under the predetermined condition is as follows. The present disclosure may be any one of the following examples or a combination of two or more examples. After the process of drying or heating the support is performed, at least one of the process of storing the support at the temperature less than atmospheric pressure, the process of cooling the support, or the process of storing the support at the atmospheric pressure may be performed. After the process of storing the support at the pressure less than the atmospheric pressure is performed, at least one of the process of drying or heating the support, the process of cooling the support, or the process of storing the support at the atmospheric pressure may be performed. The process of drying or heating the support and the process of storing the support at the pressure less than the atmospheric pressure may be performed at the same time. The process of drying or heating the support and the process of storing the support at the atmospheric pressure may be performed at the same time. The process of storing the support under the condition less than atmospheric pressure and the process of cooling the support may be performed at the same time.

The process associated with the support may optionally include a process related to the process in which the support is coupled. An example of a process sequence related to the process in which the support is coupled is as follows. The present disclosure may be any one of the following examples or a combination of two or more examples. Before the coupling process is performed, a process of providing a separate component separated from the support in a space provided inside the support may be performed. For example, the component may include a heat transfer resistor. After the coupling process is performed, the support may be packaged or stored in a vacuum state. After the process of storing the support under the predetermined condition is performed, a process of coupling a plurality of portions of the support to each other may be performed.

In relation to the support, the process may optionally include a process related to the process of washing the support. An example of a process sequence related to the process of washing the support is as follows. The present disclosure may be any one of the following examples or a combination of two or more examples. After the process of manufacturing the support is performed, at least one of the process of washing the support, the process of storing the support under the predetermined condition, or the process of coupling the plurality of portions of the support to each other may be performed. After the process of washing the support is performed, at least one of the process of storing the support under the predetermined condition or the process of coupling the plurality of portions of the support to each other may be performed. Before the process of washing the support is performed, at least one of the process of storing the support under the predetermined condition or the process of coupling the plurality of portions of the support to each other may be performed.

The process associated with the support may optionally include a process related to the process of providing the support to plate. An example of a process sequence related to the process of providing the support to the plate is as follows. The present disclosure may be any one of the following examples or a combination of two or more examples. Before the vacuum adiabatic body exhaust process is performed, the support may be provided in a space between the first plate and the second plate. Before the vacuum adiabatic body exhaust process is performed, the support may be provided at the inside of the plate or the surface of the plate. Before the vacuum adiabatic body vacuum exhaust process is performed, the support may be coupled to the plate. After the component coupling portion is provided on a portion of the plate, the support may be provided in the space between the first plate and the second plate.

FIG. 12 is a perspective view illustrating a support according to another embodiment.

Referring to FIG. 12, a support 30 of this embodiment may include a first support 350, a second support 360 coupled to the first support 350, and at least one radiation resistance sheet 32 disposed between the first support 350 and the second support 360. At least one of the first support 350 and the second support 360 may support the radiation resistance sheet 32 while passing through the radiation resistance sheet 32. If the support 30 includes a plurality of radiation resistance sheets 32, the first support 350 and the second support 360 may support a plurality of radiation resistance sheets 32 in a state in which the plurality of radiation resistance sheets 32 are spaced apart from each other.

The first support 350 may be in contact with the inner case 110. The second support 360 may contact the outer case 210. Conversely, the first support 350 may contact the outer case 210, and the second support 360 may contact the inner case 110.

FIG. 13 is a perspective view illustrating a first support, FIG. 14 is a perspective view illustrating a second support, FIG. 15 is a view illustrating a state in which a plurality of second supports are connected, and FIG. 16 is a view specifically illustrating the structure of spacers of the second support.

Referring to FIGS. 13 to 16, the first support 350 may include a first support plate 351 formed in a grid shape. In other words, the first support plate 351 may include a plurality of through-holes 352. For example, two first extension portions extending in the Z-axis direction and two second extension portions extending in the X-axis direction may define one through-hole 352. A plurality of through-holes 352 may be arranged in plurality in each of the X-axis and the Z-axis. The first support 350 may include a plurality of spacer coupling portions 353 extending in the Y-axis direction from the first support plate 351. Each spacer coupling portion 352 may be positioned at a portion where the first extension portion and the second extension portion are connected. In FIG. 13, not only the plurality of spacer coupling portions 353 are arranged in the Z-axis direction, but also the plurality of spacer coupling portions 353 may be arranged in the X-axis direction. In the present specification, the arrangement of the spacer coupling portions in the Z-axis direction is referred to as a column, and the arrangement of the spacer coupling portions in the X-axis direction is referred to as a row. The first support 350 may include, for example, spacer coupling portions in the first to seventeenth columns. In the first support 350, spacer coupling portions having the same shape may be provided in some columns, and spacer coupling portions having different shapes may be provided in some other columns. In this case, the number of columns in which the spacer coupling portions of the same shape are provided is greater than the number of columns in which the spacer coupling portions of different shapes are provided. In the first support 350, spacer coupling portions having the same shape may be provided in some rows, and spacer coupling portions having different shapes may be provided in some other rows. In this case, the number of rows in which the spacer coupling portion of the same shape is provided is greater than the number of rows in which the spacer coupling portion of the different shape is provided. For example, spacer coupling portions having different shapes may be provided in the first, sixth, twelfth, and seventeenth columns. On the other hand, spacer coupling portions having the same shape may be provided in the second to fifth rows, the seventh to the eleventh rows, and the thirteenth to the sixteenth columns. In the present specification, it should be noted that there is no limit to the number of columns and rows included in one first support 350. The plurality of spacer coupling portions 353 may be divided based on a length in the Y-axis direction, for example, a height. The plurality of spacer coupling portions 353 may include a first spacer coupling portion 353*a*, a second spacer coupling portion 353*b*, and a third spacer coupling portion 353*c*. The second spacer coupling portion 353*b* is longer than the first spacer coupling portion 353*a*, and the third spacer coupling portion 353*c* is longer than the second spacer coupling portion 353*b*. Among the plurality of spacer coupling portions 356, the number of first spacer coupling portions 353a is the largest and the number of second spacer coupling portions 353b is the smallest. In the first support 350, some rows 354b and some columns may include only the first spacer coupling portion 353a. In the first support 350, some other rows may include only the first spacer coupling portion 353a and the second spacer coupling portion 353b. In this case, a plurality of first spacer coupling portions 353a may be provided between the two second spacer coupling portions 353b spaced apart from each other. In the first support 350, another partial row 354a may include only the first spacer coupling portion 353a and the third spacer coupling portion 353c. In this case, a plurality of first spacer coupling portions 353a may be provided between the two third spacer coupling portions 353c spaced apart from each other. In the first support 350, some other columns may include all of the first spacer coupling portion 353a, the second spacer coupling portion 353b, and the third spacer coupling portion 353c. In a column including the first spacer coupling portion 353a, the second spacer coupling portion 353b, and the third spacer coupling portion 353c, at least two third spacer coupling portions 353c may be positioned to be adjacent to each other. Two rows 354c including only the third spacer coupling portion 353c and the first spacer coupling portion 353a may be positioned adjacent to each other. In a column including the second spacer coupling portion 353b and the third spacer coupling portion 353c, at least one first spacer coupling portion 353a is provided between the second spacer coupling portion 353b and the third spacer coupling portion 353c.

Meanwhile, the plurality of second supports 360 may be coupled to each other in the left and right direction with reference to FIG. 15 while having the same structure. In FIG. 15, the left and right direction (Z-axis direction) may be the vertical direction (longitudinal direction) of the door. Each second support 360 includes a coupling portion 361a on one side surface thereof, and two adjacent second supports 360 may be coupled by the coupling portion 361a. The second support 360b may include a second support plate 361 having a grid shape. The second support plate 361 may include a plurality of through-holes 362. For example, two first extension portions extending in the Z-axis direction and two second extension portions extending in the X-axis direction may define one through-hole 362. A plurality of through-holes 362 may be arranged in plurality in each of the X-axis and the Z-axis. The second support 360 may include a plurality of spacers 363 extending from the second support plate 361 in the Y-axis direction. Each spacer 366 may be positioned at a portion where the first extension portion and the second extension portion are connected. Each of the plurality of spacers 363 may be coupled to each of the plurality of spacer coupling portions 353. In the present embodiment, one bar is completed by coupling one spacer 363 and one spacer coupling portion 353. Accordingly, the plurality of bars are completed by coupling the first support 350 and the second support 360 of the present embodiment. In the above description, it has been described that the first support 350 includes the spacer coupling portion 353 and the second support 360 includes the spacer 363, but on the contrary, it is also possible that the first support 350 includes the spacer and the second support 360 includes a spacer coupling portion. In any case, any one of the spacers is coupled with any one of the spacer coupling portions to form a bar. In FIG. 14, not only the plurality of spacers 363 may be arranged in the Z-axis direction, but also the plurality of spacers 363 may be arranged in the X-axis direction. The second support 360 may include spacers in the first to seventeenth columns, for example. In the second support 360, spacers having the same shape may be provided in some columns, and spacers having different shapes may be provided in some other columns. In the second support 360, spacers having the same shape may be provided in some rows 363d, and spacers having different shapes may be provided in some other rows. For example, spacers of different shapes may be provided in the first column, the sixth column, the twelfth column, and the seventeenth column. On the other hand, spacers having the same shape may be provided in the second to fifth columns, seventh to eleventh columns, and thirteenth to sixteenth columns. It is noted that in the present specification, there is no limit to the number of columns and rows included in one second support 360. The plurality of spacers 363 may include a first spacer 363a, a second spacer 363b, and a third spacer 363c. The first spacer 363a does not support the radiation resistance sheet 32. Since the first spacer 363a does not support the radiation resistance sheet 32, the structure of the first spacer 363a may be simpler than that of the other spacers 363b and 363c. In the second support 360, some rows and some columns may include only the first spacer 363a. In the second support 360, some other rows may include only the first spacer 363a and the second spacer 363b. In this case, a plurality of first spacers 363a may be positioned between two second spacers 363b spaced apart from each other. In the second support 360, another partial row may include only the first spacer 363a and the third spacer 363c. In this case, a plurality of first spacers 363a may be positioned between two third spacers 363c spaced apart from each other. In the second support 360, some columns may include all of the first spacer 363a, the second spacer 363b, and the third spacer 363c. In a column including the second spacer 363b and the third spacer 363c, the second spacer 363b and the third spacer 363c may be located adjacent to each other. The number of rows including the first spacer 363a in the second support 360 is greater than the number of rows including the first spacer 363a and the second spacer 363b. The number of rows including the first spacer 363a in the second support 360 is greater than the number of rows including the first spacer 363a and the third spacer 363c. In the second support 360, the number of columns including the first spacers 363a is greater than the number of columns including the first spacer 363a to the third spacer 363c.

FIG. 17 is a cross-sectional view illustrating a state in which the first support and the second support are coupled, FIG. 18 is an enlarged view illustrating part A of FIG. 17, FIG. 19 is an enlarged view illustrating part B of FIG. 17, FIG. 20 is an enlarged view illustrating a part C of FIG. 17, and FIG. 21 is an enlarged view illustrating part D of FIG. 17.

Referring to FIGS. 17 to 21, the first spacer 363a of the second support 360 may be coupled to the first spacer coupling portion 353a of the first support 350. A first bar is defined by the coupling of the first spacer 363a and the first spacer coupling portion 353a. The second spacer 363b of the second support 360 may be coupled to the first spacer coupling portion 353a of the first support 350. A second bar is defined by coupling to the second spacer 363b and the second spacer coupling portion 353a. The third spacer 363c of the second support 360 may be coupled to the second spacer coupling portion 353b of the first support 350. A third bar is defined by coupling to the third spacer 363c and the second spacer coupling portion 353b. The first spacer 363a of the second support 360 may be coupled to the first spacer coupling portion 353c of the first support 350. A fourth bar is defined by coupling to the first spacer 363a and the third spacer coupling portion 353c. In other words, In the present embodiment, four types of bars may be defined by the coupling of the first support 350 and the second support 360. In the description of FIGS. 17 to 21, "a length" means a length in the arrangement direction of the first support plate 351 and the second support plate 361.

FIG. 18 illustrates a first bar. Referring to FIG. 18, the radiation resistance sheet 32 may include a first hole 32a. The first spacer 363a may pass through the first hole 32a of the radiation resistance sheet 32 to be coupled to the first spacer coupling portion 353a. In a state in which the first spacer 363a is coupled to the first spacer coupling portion 353a, the first spacer 363a and the first spacer coupling portion 353a are spaced apart from the radiation resistance sheet 32. Accordingly, the first bar is a bar that does not support the radiation resistance sheet 32. The length of the first spacer 363a is longer than the length of the first spacer coupling portion 353a. The first spacer 363a may be inserted into the first spacer coupling portion 353a. For example, the first spacer coupling portion 353a may be formed in a cylindrical shape. An outer diameter D1 of the first spacer coupling portion 353a may be larger than a diameter of the first hole 32a. An inner diameter D3 of the first spacer coupling portion 353a may be the same as a diameter of a portion of the first spacer 363a. The diameter D2 of the entrance of the first spacer coupling portion 353a may be larger than the inner diameter D3 of the first spacer coupling portion 353a so that the first spacer 363a can be easily inserted into the first spacer coupling portion 353a. The diameter of the first spacer 363a may decrease toward the first support 35.

FIG. 19 illustrates a second bar. Referring to FIG. 19, the radiation resistance sheet 32 may include a second hole 32b. The second spacer 363b may pass through the second hole 32b of the radiation resistance sheet 32 to be coupled to the first spacer coupling portion 353a. In a state in which the second spacer 363b is coupled to the first spacer coupling portion 353a, the second spacer 363a and the first spacer coupling portion 353a are spaced apart from the radiation resistance sheet 32. Accordingly, the second bar is a bar that does not support the radiation resistance sheet 32. The length of the second spacer 363b is longer than the length of the first spacer coupling portion 353a. The second spacer 363b may include a second portion 363b2 extending from the second support plate 361 and a first portion 363b1 extending from the second portion 363b2 and having a diameter smaller than a diameter of the second portion 363b2. A stepped portion 363b3 may be formed between the first portion 363b1 and the second portion 363b2 due to a difference in diameter between the first portion 363b1 and the second portion 363b2. The length of the second part 363b2 is formed to be longer than the length of the first part 363b1. A length of the first portion 363b1 is longer than a length of the first spacer coupling portion 353a. Accordingly, when the first part 363b1 is inserted into the first spacer coupling portion 353a, the first spacer coupling portion 353a is spaced apart from the stepped portion 363b3. A diameter Da2 of a point adjacent to the first part 363b1 in the second part 363b2 is smaller than a diameter Da3 of a point adjacent to the second support plate 361. For example, the diameter of the second portion 363b2 may decrease toward the first spacer coupling portion 353a. A diameter Da2 of a point adjacent to the first portion 363b1 in the second portion 363b2 is greater than a diameter Da1 of the first portion 363b1. Accordingly, a diameter Da2 of a point adjacent to the first portion 363b1 in the second portion 363b2 is greater than an inner diameter D3 of the first spacer coupling portion 353a. In FIG. 19, the second bar does not support the radiation resistance sheet 32, but if an additional radiation resistance sheet is provided, the second bar may support the additional radiation resistance sheet. For example, the additional radiation resistance sheet may be seated and supported on the stepped portion 363b3 of the second spacer 363b.

FIG. 20 illustrates a third bar. Referring to FIG. 20, the radiation resistance sheet 32 may include a third hole 32c. The first spacer 363a may pass through the third hole 32c of the radiation resistance sheet 32 to be coupled to the third spacer coupling portion 353c. In a state in which the first spacer 363a is coupled to the third spacer coupling portion 353c, the first spacer 363a and the third spacer coupling portion 353c are spaced apart from the radiation resistance sheet 32. Accordingly, the third bar is a bar that does not support the radiation resistance sheet 32. In this case, the diameter of the third hole 32c may be greater than the outer diameter of the third spacer coupling portion 353c. The length of the first spacer 363a is longer than the length of the third spacer coupling portion 353c. The outer diameter of the third spacer coupling portion 353c may decrease toward the second support 360. A portion of the inner diameter of the third spacer coupling portion 353c may be constant toward the second support 360, and another portion thereof may increase toward the second support 360. Accordingly, a portion of the first spacer 363a may be in contact with the inner peripheral surface of the third spacer coupling portion 353c while being inserted into the third spacer coupling portion 353c. On the other hand, the other portion of the first spacer 363a may be spaced apart from the inner peripheral surface of the third spacer coupling portion 353c while being inserted into the third spacer coupling portion 353c.

FIG. 21 illustrates a fourth bar. Referring to FIG. 21, the radiation resistance sheet 32 may include a fourth hole 32d. The third spacer 363c may pass through the fourth hole 32d of the radiation resistance sheet 32 to be coupled to the second spacer coupling portion 353b. In a state in which the third spacer 363c is coupled to the second spacer coupling portion 353b, the third spacer 363c may support the radiation resistance sheet 32. Accordingly, the fourth bar is a bar that supports the radiation resistance sheet 32. The third spacer 363c may include a second portion 363c2 extending from the second support plate 361 and a first portion 363c1 extending from the second portion 363c2 and having a diameter smaller than a diameter of the second portion 363c2. A stepped portion 363c3 may be formed between the first portion 363c1 and the second portion 363c2 due to a difference in diameter between the first portion 363c1 and the second portion 363c2. The diameter of the fourth hole 32d is formed to be larger than that of the first portion 363c1 and smaller than the diameter of the second portion 363c2. Accordingly, the radiation resistance sheet 32 may be seated and supported on the stepped portion 363c3 of the third spacer 363c. The length of the second portion 363c2 is shorter than the length of the first portion 363c1. The length of the first portion 363c1 is longer than the length of the second spacer coupling portion 353b. In this case, the gap between the stepped portion 363b and the second spacer coupling portion 353b may be the same as or similar to the thickness of the radiation resistance sheet 32. Accordingly, it is possible to minimize movement of the radiation resistance sheet 32 in the longitudinal direction of the fourth bar while the radiation resistance sheet 32 is seated on the seating portion 363c. In this case, since the impact of the radiation resistance sheet 32 and the fourth bar is minimized by vibration, there is an advantage that the impact noise is reduced. In particular, when the radiation resistance sheet 32 comes into contact with the second spacer coupling portion 353b while being seated on the seating portion 363c, it is prevented the radiation resistance sheet 32 from being moved in the longitudinal direction of the fourth bar, and thus there is an advantage that the impact noise is eliminated. The outer diameter of the second spacer coupling portion 353b may decrease toward the second support 360. A portion of the inner diameter of the second spacer coupling portion 353b may be constant toward the second support 360, and another portion thereof may increase toward the second support 360. Accordingly, a portion of the third spacer 363c may be in contact with the inner peripheral surface of the second spacer coupling portion 353b while being inserted into the second spacer coupling portion 353b. On the other hand, the other portion of the third spacer 363c may be spaced apart from the inner peripheral surface of the second spacer coupling portion 353b while being inserted into the second spacer coupling portion 353b.

FIG. 22 is a view illustrating a state in which a heat exchange conduit is disposed on the first support of FIG. 13.

Referring to FIG. 22, a heat exchange conduit may be disposed in an area formed by the support 30. The heat exchange conduit may be formed by joining an inlet pipe 171 through which a refrigerant is introduced into an evaporator placed in a refrigerator and an outlet pipe 172 through which a refrigerant is drawn out from the evaporator. The two conduits that are the inlet pipe 171 and the outlet pipe 172 may be joined to each other by welding or the like. Each refrigerant flowing inside the inlet pipe 171 and the outlet pipe 172 may perform heat exchange with each other to improve the efficiency of the refrigeration cycle. In the present embodiment, since the length of the third spacer coupling portion 353c of the first support 350 is formed to be longer than the length of the first and second spacer coupling portions 353a and 353b, the strength of the bars formed by the third spacer coupling portion 353c may be greater than that of other types of bars. As such, the inlet pipe 171 and the outlet pipe 172 may be supported to a pipe support portion by connecting the pipe support portion, not illustrated, to the strong bar as described above. For example, the inlet pipe 171 and the outlet pipe 172 may be positioned between two adjacent third spacer coupling portions 353c.

FIG. 23 is a perspective view illustrating a support of another embodiment.

The support of FIG. 23 is the same as the support of FIGS. 12 to 21 in other portions, except that there is a difference in the type of bar supporting the radiation resistance sheet. Therefore, only the characteristic parts of the present embodiment will be described below.

Referring to FIGS. 19 and 23, the support 30a of the present embodiment may include a first support 350a, a second support 360a coupled to the first support 350a, and at least one radiation resistance sheet 32 disposed between the first support 350a and the second supports 360. The first support 350a has the same structure as the first support 350 of FIG. 14, and the second support 360a has the same structure as the second support 360 of FIGS. 14 to 16.

The radiation resistance sheet 32, the position of which is changed in FIG. 19, can be seated and supported on the stepped portion 363b3 of the second spacer 363b, and while the radiation resistance sheet 32 is seated on the stepped portion 363b3, the radiation resistance sheet 32 may be in contact with the first spacer coupling portion 353a or may be positioned adjacent to the first spacer coupling portion 353a.

As another example, the structure of the first support 350 may be replaced with the second support 360, and the structure of the second support 360 may be replaced with the first support 350.

The invention claimed is:

1. A vacuum adiabatic body comprising:
a first plate;
a second plate spaced apart from the first plate to form a vacuum space between the first plate and the second plate;
and
a support provided between the first plate and the second plate,
wherein the support includes:
a first support plate having a plurality of columns and a plurality of rows arranged to have a grid shape, and a plurality of spacer couplers to protrude from the first support plate,
a second support plate arranged to have a grid shape, and a plurality of spacers to protrude from the second support plate, and the plurality of spacers configured to couple to each of the plurality of spacer couplers to form a plurality of bars; and
a sheet configured to support at least one of the plurality of bars, and the sheet is spaced apart from at least one of the first support plate and the second support plate,
wherein the plurality of spacer couplers are arranged in the plurality of columns and the plurality of rows of the first support plate, and
wherein only a spacer couplers having a same shape is provided in a first set of columns of the plurality of columns, and the spacer couplers having different shapes are provided in a second set of columns of the plurality of columns.

2. The vacuum adiabatic body of claim 1,
wherein a first number of the first set of columns is greater than a second number of the second set of columns.

3. The vacuum adiabatic body of claim 1,
wherein the spacer couplers having the same shape are provided in a first set of rows of the plurality of rows, and the spacer couplers having different shapes are provided in a second set of rows of the plurality of rows, and
wherein a first number of the first set of rows is greater than a second number of the second set of rows.

4. The vacuum adiabatic body of claim 1,
wherein the plurality of spacer couplers include a first spacer coupler having a first height, a second spacer coupler having a second height, and a third spacer coupler having a third height, where the first height, the second height and the third height are all different heights, and
wherein the second spacer coupler is higher than the first spacer coupler, and the third spacer coupler is higher than the second spacer coupler.

5. The vacuum adiabatic body of claim 4,
wherein only the first spacer coupler is provided in some rows of the plurality of rows,
wherein the first spacer coupler and the second spacer coupler are provided in some other rows of the plurality of rows, and
wherein the first spacer coupler and the third spacer coupler are provided in another some row of the plurality of rows.

6. The vacuum adiabatic body of claim 4,
wherein at least two rows including the third spacer coupler are disposed adjacent to each other, or wherein in a row including the first spacer coupler and the second spacer coupler, at least one first spacer coupler is positioned between two second spacer couplers, or wherein in a row including the first spacer coupler and the third spacer coupler, at least one first spacer coupler is positioned between two third spacer coupler.

7. The vacuum adiabatic body of claim 4, wherein only the first spacer coupler is provided in some rows of the plurality of rows, wherein the first spacer coupler, the second spacer coupler, and the third spacer coupler are provided in some other rows of the plurality of rows.

8. The vacuum adiabatic body of claim 7, wherein in a row including the first spacer coupler to the third spacer coupler, at least two third spacer couplers are located adjacent to each other, or wherein in a row including the first spacer coupler to the third spacer coupler, at least one first spacer coupler is provided between the second spacer coupler and the third spacer coupler.

9. The vacuum adiabatic body of claim 4, wherein the plurality of spacers includes a first spacer having a first shape, a second spacer having a second shape, and a third spacer having a third shape, wherein the first shape is different than the second shape and is different than the third shape, and the second shape is different than the third shape.

10. The vacuum adiabatic body of claim 9, wherein the plurality of bars include a first bar, a second bar, a third bar, and a fourth bar, wherein the first bar is formed by the first spacer coupled to the spacer coupler, wherein the second bar is formed by the second spacer is coupled to the first spacer coupler, wherein the third bar is formed by the third spacer coupled to the second spacer coupler, wherein the fourth bar is formed by the first spacer coupled to the third spacer coupler, and wherein only the fourth bar supports the sheet.

11. A vacuum adiabatic body comprising:

a support disposed in a vacuum space, wherein the support includes:

a first support plate formed to have a grid shape, and a plurality of spacer couplers to protrude from the first support plate, a second support plate formed to have a plurality of columns and a plurality of rows arranged to have a grid shape, and a plurality of spacers to protrude from the second support plate, and configured to couple to each of the plurality of spacer couplers to form a plurality of bars; and a sheet configured to support at least one of the plurality of bars, and the sheet is spaced apart from at least one of the first support plate and the second support plate, wherein the plurality of spacers are arranged in the plurality of columns and the plurality of rows of the second support plate, and wherein only spacers having a same shape is provided in a first set of columns of the plurality of columns, and a spacers having different shapes are provided in a second set of columns of the plurality of columns.

12. The vacuum adiabatic body of claim 11, wherein a first number of the first set of columns is greater than a second number of the second set of columns, or wherein the spacers having the same shape are provided in a first set of rows of the plurality of rows, and the spacers having different shapes are provided in a second set of rows of the plurality of rows.

13. The vacuum adiabatic body of claim 12, wherein a first number of rows in the first set of rows is greater than a second number of rows in the second set of rows.

14. The vacuum adiabatic body of claim 11, wherein the plurality of spacers includes a first spacer having a first shape, a second spacer having a second shape, and a third spacer having a third shape, wherein the first shape is different than the second shape and is different than the third shape, and the second shape is different than the third shape.

15. The vacuum adiabatic body of claim 14, wherein only the first spacer is provided in some rows of the plurality of rows, wherein the first spacer and the second spacer are provided in some other rows of the plurality of rows, and wherein the first spacer and the third spacer are provided in another some row of the plurality of rows.

16. The vacuum adiabatic body of claim 15, wherein the number of rows including only the first spacer is largest, or wherein a row including the first spacer and the second spacer and a row including the first spacer and the third spacer are positioned adjacent to each other.

17. The vacuum adiabatic body of claim 14, wherein only the first spacer is provided in some columns of the plurality of columns, and wherein the first spacer, the second spacer, and the third spacer are provided in some other columns of the plurality of columns.

18. The vacuum adiabatic body of claim 17, wherein in a column including the first spacer to the third spacer, the second spacer and the third spacer are positioned adjacent to each other, or wherein in a column including the first spacer to the third spacer, at least one first spacer is provided between the second spacer and the third spacer.

19. The vacuum adiabatic body of claim 14, wherein the plurality of spacer couplers include a first spacer coupler having a first height, a second spacer coupler having a second height, and a third spacer coupler having a third height, wherein the first height, the second height and the third height are all different heights, and wherein the second spacer coupler is longer than the first spacer coupler, and the third spacer coupler is longer than the second spacer coupler.

20. The vacuum adiabatic body of claim 19, wherein the plurality of bars include a first bar, a second bar, a third bar, and a fourth bar, wherein the first bar is formed by the first spacer coupled to the first spacer coupler, wherein the second bar is formed by the second spacer coupled to the first spacer coupler, wherein the third bar is formed by the third spacer coupled to the second spacer coupler, wherein the fourth bar is formed by the first spacer coupled to the third spacer coupler, and wherein only the fourth bar supports the sheet.

* * * * *